US012643043B2

(12) United States Patent
McCoy et al.

(10) Patent No.: US 12,643,043 B2
(45) Date of Patent: Jun. 2, 2026

(54) METHOD AND SYSTEM FOR CREATING AND SHARING VIDEO GAME ANNOTATIONS

(71) Applicant: SONY INTERACTIVE ENTERTAINMENT LLC, San Mateo, CA (US)

(72) Inventors: Charles McCoy, San Mateo, CA (US); True Xiong, San Mateo, CA (US)

(73) Assignee: SONY INTERACTIVE ENTERTAINMENT LLC

( * ) Notice: Subject to any disclaimer, the term of this patent is extended or adjusted under 35 U.S.C. 154(b) by 275 days.

(21) Appl. No.: 18/382,933

(22) Filed: Oct. 23, 2023

(65) Prior Publication Data
US 2025/0128158 A1 Apr. 24, 2025

(51) Int. Cl.
*A63F 13/5375* (2014.01)
*A63F 13/52* (2014.01)
*A63F 13/86* (2014.01)

(52) U.S. Cl.
CPC .......... *A63F 13/5375* (2014.09); *A63F 13/52* (2014.09); *A63F 13/86* (2014.09)

(58) Field of Classification Search
CPC ....... A63F 13/5375; A63F 13/52; A63F 13/86
See application file for complete search history.

(56) References Cited

U.S. PATENT DOCUMENTS

| | | | |
|---|---|---|---|
| 2020/0129856 A1 | 4/2020 | Bond et al. | |
| 2021/0097584 A1 | 4/2021 | Ranjan et al. | |
| 2023/0056715 A1 | 2/2023 | Cote et al. | |
| 2023/0214706 A1 | 7/2023 | Rossi | |
| 2023/0222537 A1 | 7/2023 | Inamdar et al. | |
| 2023/0330542 A1* | 10/2023 | Marr ..................... | A63F 13/355 |

OTHER PUBLICATIONS

PCT Application No. PCT/US2024/025752, International Search Report and Written Opinion dated Aug. 2, 2024.
PCT/US2024/025752, True Xiong, Automatic Creation and Recommendation of Video Game Fragments, Apr. 23, 2024.
U.S. Appl. No. 18/374,368, True Xiong, Automatic Creation and Recommendation of Video Game Fragments, Sep. 28, 2023.
U.S. Appl. No. 18/382,934, Charles McCoy, Annotating Player or Spectator Sentiment for Video Game Fragment Generation, Oct. 23, 2023.

* cited by examiner

*Primary Examiner* — Peter J Iannuzzi
(74) *Attorney, Agent, or Firm* — Kilpatrick Townsend & Stockton LLP

(57) ABSTRACT
A method for annotating a video game includes recording a first session of the video game including first gameplay output and first game state data, receiving an annotation including one or more of video, audio, graphics, text, or highlighting, associating the annotation with a selected point in the video game, the selected point corresponding to a selected portion of the first game state data, and presenting the annotation, in response to a triggering condition, at the selected point in the video game in a second session thereof, the second session including second gameplay output and second game state data.

40 Claims, 18 Drawing Sheets

Recording a first session of a video game — 802

Receiving an annotation — 804

Associating the annotation with a selected point in the video game — 806

Presenting the annotation, in response to a triggering condition, at the selected point in the video game in a second session thereof — 808

METHOD AND SYSTEM FOR CREATING AND SHARING VIDEO GAME ANNOTATIONS

BACKGROUND

1. Field of the Disclosure

The present invention generally relates to video games. More specifically, the present invention relates to creating and sharing annotations of video games and video game fragments.

2. Description of the Related Art

In recent years, video games have become a multi-billion-dollar business. However, competition for a user's time and money has never been fiercer. Certain games, such as role-playing games (RPGs), are frequently intended to be complex and time-consuming, increasing the need to take notes or otherwise maintain a list of clues or challenges in the game. However, unless a game has been specifically programmed to allow note taking, users may resort to offline game journals, which are inconvenient and offer no help to other players.

Similarly, expert players may wish to leave hints or create a walkthrough, tutorial, or strategy manual for a game, but are currently limited to doing so outside of the game context unless specifically enabled to do so in the game code. Even if the game code includes such a feature, it is only for the particular game and does nothing to enable the feature in an ecosystem of videogames centered around a particular console or gaming company, which may include games produced by a number of different developers.

Many games are meant to be played in groups. Unfortunately, unless a game has been programmed to allow group members to share game strategies and the like, individuals within the group will have to coordinate outside of the game context, either in person or using online communities, such as Discord, which reduces gameplay and increases the risk that users will be distracted by other activities and not return to the game.

SUMMARY

Embodiments of the present invention include systems and methods for creating and sharing annotations of video games and video game fragments. According to one aspect, a method for annotating a video game includes recording a first session of the video game including first gameplay output and first game state data. The method also includes receiving an annotation including one or more of video, audio, graphics, text, or highlighting. The method further includes associating the annotation with a selected point in the video game, the selected point corresponding to a selected portion of the first game state data. In addition, the method includes presenting the annotation, in response to a triggering condition, at the selected point in the video game in a second session thereof, the second session including second gameplay output and second game state data.

In an example, presenting the annotation includes overlaying the annotation upon the second gameplay output at the selected point or replacing at least a portion of the second gameplay output at the selected point with the annotation.

In another example, the annotation includes the selected portion of the first game state data, and presenting the annotation includes launching the video game at the selected point using the selected portion of the first game state data.

In a further example, the annotation includes metadata for highlighting one or more portions of a display screen or positioning the video, graphics, text, or highlighting upon the display screen.

In yet another example, receiving the annotation is in response to an author of the annotation supplying or selecting the annotation.

In still another example, the annotation is selected by the author from the first gameplay output, and the author determines the selected point in the video game. Alternatively, at least one of the annotation or the selected point in the video game are selected by a trained machine learning model.

In an example, the first session of the video game is recorded from gameplay of the author. Alternatively, the first session of the video game is recorded from gameplay by another player or an automated process.

In another example, the triggering condition includes at least some of the second game state data matching at least some of the selected portion of the first game state data.

In yet another example, the annotation includes a tag, and the triggering condition includes the tag satisfying an annotation filter specified by a player of the second session of the video game.

In still another example, the tag specifies an author for the annotation, and the annotation filter specifies a particular author in order to satisfy the triggering condition.

In an additional example, the tag specifies a type for the annotation, and the annotation filter specifies a particular type in order to satisfy the triggering condition.

In some examples, the annotation is locked to prevent unauthorized access, and the triggering condition includes a player of the second session unlocking the annotation.

In certain examples, the method further includes sending a key, such as a password, token, or URL, from an author of the annotation to the player of the second session.

In an example, the method further includes determining whether particular data is found within a profile of the player of the second session and unlocking the annotation when the particular data is found within the profile of the player of the second session.

In another example, receiving the annotation includes receiving at least one access control for limiting access to certain players.

In yet another example, a player of the second session satisfies the at least one access control, where the triggering condition includes that the player of the second session satisfies the at least one access control.

In still another example, the at least one access control indicates that the player of the second session is: an author of the annotation, a friend of the author, or a subscriber of the author.

In some examples, the method further includes notifying a player of the second session at the selected point in the video game that the annotation is available to be displayed, where the triggering condition includes the player of the second session indicating a desire to have the annotation presented.

According to another aspect, a system for annotating a video game includes a gameplay recorder that records a first session of the video game including first gameplay output and first game state data. The system also includes an overlay processor that receives an annotation including one or more of video, audio, graphics, text, or highlighting. The overlay processor also associates the annotation with a selected point in the video game, the selected point corresponding to a selected portion of the first game state data. The overlay processor further presents the annotation, in response to a triggering condition, at the selected point in the video game in a second session thereof, the second session including second gameplay output and second game state data.

In an example, the overlay processor presents the annotation by overlaying the annotation upon the second gameplay output at the selected point or replacing at least a portion of the second gameplay output at the selected point with the annotation.

In another example, the annotation includes the selected portion of the first game state data, and the overlay processor presents the annotation by launching the video game at the selected point using the selected portion of the first game state data.

In still another example, the overlay processor receives the annotation in response to an author of the annotation supplying or selecting the annotation.

In some examples, the system further includes a user interface from which the annotation is selected by the author from the first gameplay output, and/or a user interface by which the author determines the selected point in the video game.

In another example, the gameplay recorder records the first session of the video game from gameplay of the author.

In yet another example, the system further includes a communication network interface that sends a key for unlocking the annotation from an author of the annotation to the player of the second session.

In still another example, the overlay processor determines whether particular data is found within a profile of the player of the second session and unlocks the annotation when the particular data is found within the profile of the player of the second session.

In another example, the annotation is associated with at least one access control for limiting access to certain players, and the overlay processor determines whether a player of the second session satisfies the at least one access control, the triggering condition includes that the player of the second session satisfies the at least one access control.

In yet another example, the overlay processor notifies a player of the second session at the selected point in the video game that the annotation is available to be displayed, where the triggering condition includes the player of the second session indicating a desire to have the annotation presented.

In still another example, the system further includes a trained machine learning model to automatically select at least one of the annotation or the selected point in the video game.

DETAILED DESCRIPTION

The following embodiments describe methods and systems for creating and sharing video game annotations for one or more video games or video game fragments.

It will be understood, however, to one skilled in the art, that the present invention may be practiced without some or all of these specific details. In other instances, well known process operations have not been described in detail in order not to unnecessarily obscure the present invention.

Figures 1A, 1B:
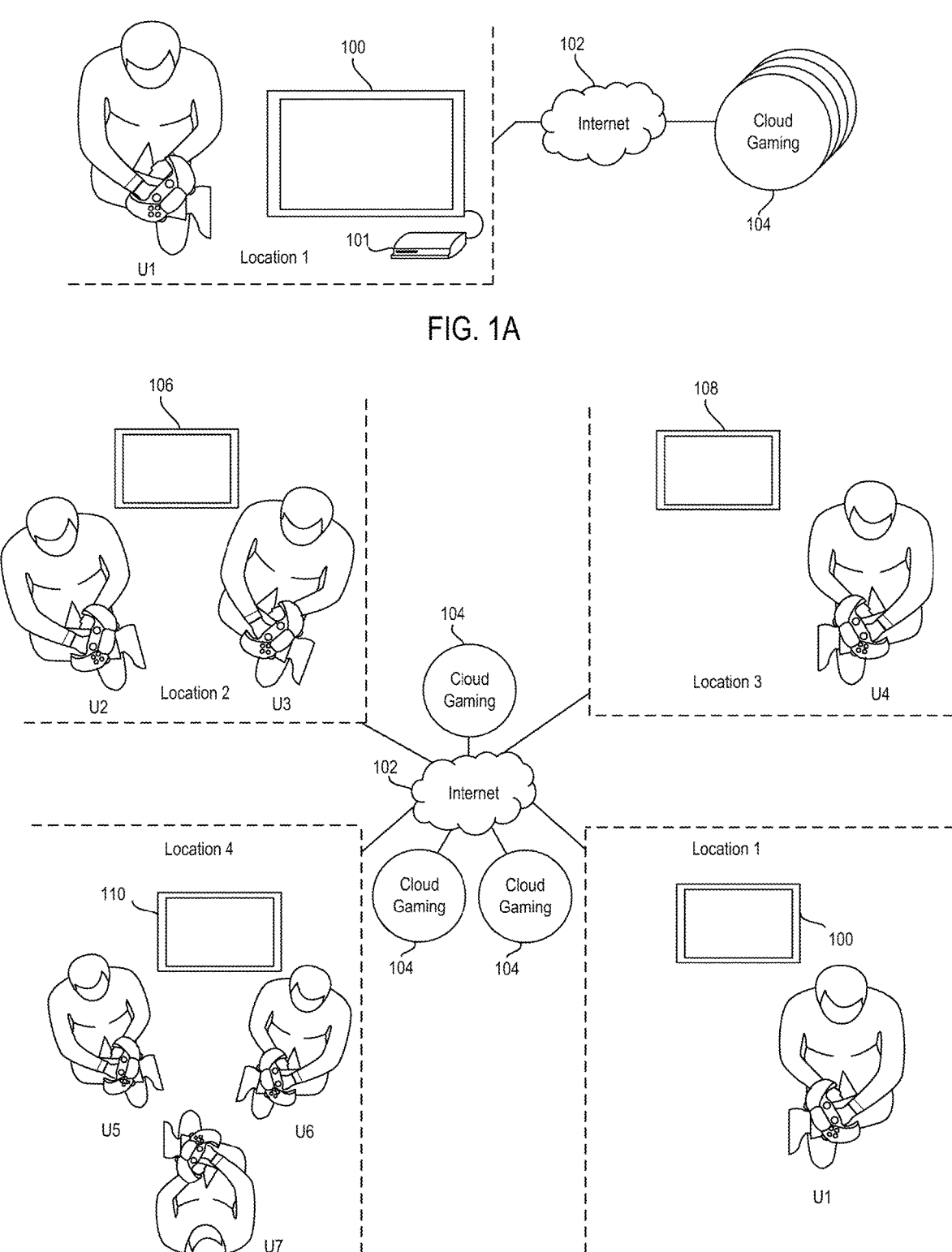
FIG. 1A illustrates a user playing a cloud-based video game.
FIG. 1B illustrates multiple users in multiple locations engaged in gameplay of cloud-based video games.

FIG. 1A illustrates a user playing a cloud-based video game. As shown, a user U1 plays a cloud-based video game shown on a display 100. A cloud-based video game is a video game that is substantially executed on a remote server. A server, in one embodiment, can include individual servers or servers that are executed in a virtual machine data center, where many servers can be virtualized to provide the requested processing.

In the illustrated embodiment, cloud gaming server(s) 104 execute the video game that is rendered on the display 100. A client 101 is situated at the user's location to receive and process inputs and communicate these to the cloud gaming servers 104, and also to receive video and audio data from the cloud gaming servers 104. The client 101 and the cloud gaming servers 104 communicate over a network 102, such as the Internet. In other embodiments, the client can be any device, whether portable or not, whether wireless or not, so long as the client can communicate with a network and provide access to a display for rendering game play and enable input from a user to drive interactivity. In one embodiment, the client is a thin client. However, in other embodiments, the client can be a general purpose computer, a special purpose computer, a gaming console, a personal computer, a laptop computer, a tablet computer, a mobile computing device, a portable gaming device, a cellular phone, a set-top box, a streaming media interface/device, a smart television or networked display, a virtual reality (VR) or augmented reality (AR) system, or any other computing device capable of being configured to fulfill the functionality of a client as defined herein. In one embodiment, the cloud gaming server is configured to detect the type of client device, which is being utilized by the user, and provide a cloud-gaming experience appropriate to the user's client device. For example, image settings, audio settings and other types of settings may be optimized for the user's client device.

In various embodiments, the degree of processing performed by the client may vary with respect to input and output processing. However, in some cases, the video game state is substantially maintained and executed on the cloud gaming servers 104, with the client primarily functioning to receive and communicate user inputs, and receive video/ audio data for rendering. The client 101 may be a standalone device that is connected to the display 100 and provides video data for rendering on the display 100. In other embodiments, the client can be integrated into the display 100. In one embodiment, the display 100 is a networked display providing a platform operating system for applications or "apps" utilizing the network connectivity of the display. In such an embodiment, the client can be defined by an application executed on the platform provided by the display's operating system.

FIG. 1B illustrates multiple users in multiple locations engaged in gameplay of cloud-based video games. The user U1 is shown at a first location interacting with a video game rendered on the display 100. Users U2 and U3 are shown at a second location interacting with a video game rendered on a display 106. A user U4 is shown at a third location playing a video game rendered on a display 108. Users U5, U6, and U7 are shown at a fourth location interacting with a video game rendered on a display 110.

At each of the first, second, third, and fourth locations, at least one computing device is provided for processing input from the various users and rendering a cloud-based video game on their respective displays. It should be appreciated that the computing device can be integrated into a display, or may be a standalone device such as a personal computer, set top box, gaming console, VR headset, or any other type of device having at least one processor and memory for processing and storing data. The computing device can execute or define a client, as has been described above. The computing devices are networked and communicate over the network 102 with cloud gaming servers 104. In some cases, a single computing device in a location can perform processing for more than one user. In other cases, each user in a location can have a computing device performing processing dedicated to that user, which may be combined with other computing devices at that location.

The cloud gaming servers 104 execute the various video games that are being played by the users, defining a given video game's game state from moment to moment, and sending video data (including image data and audio data) to a computing device at a particular location. The computing device at a given location processes input from the user(s) playing the video game, and transmits input data to the cloud gaming server, which in turn processes the input data to affect the game state of the video game. It should be appreciated that cloud-based gaming facilitates multi-player gaming from players located at different locations by providing for execution of the video game at a remote server that is accessible by all players over a network. In this manner, execution of the video game is not dependent on any single player's hardware or network conductivity, although such will affect the user experience for that given player.

Figure 2:
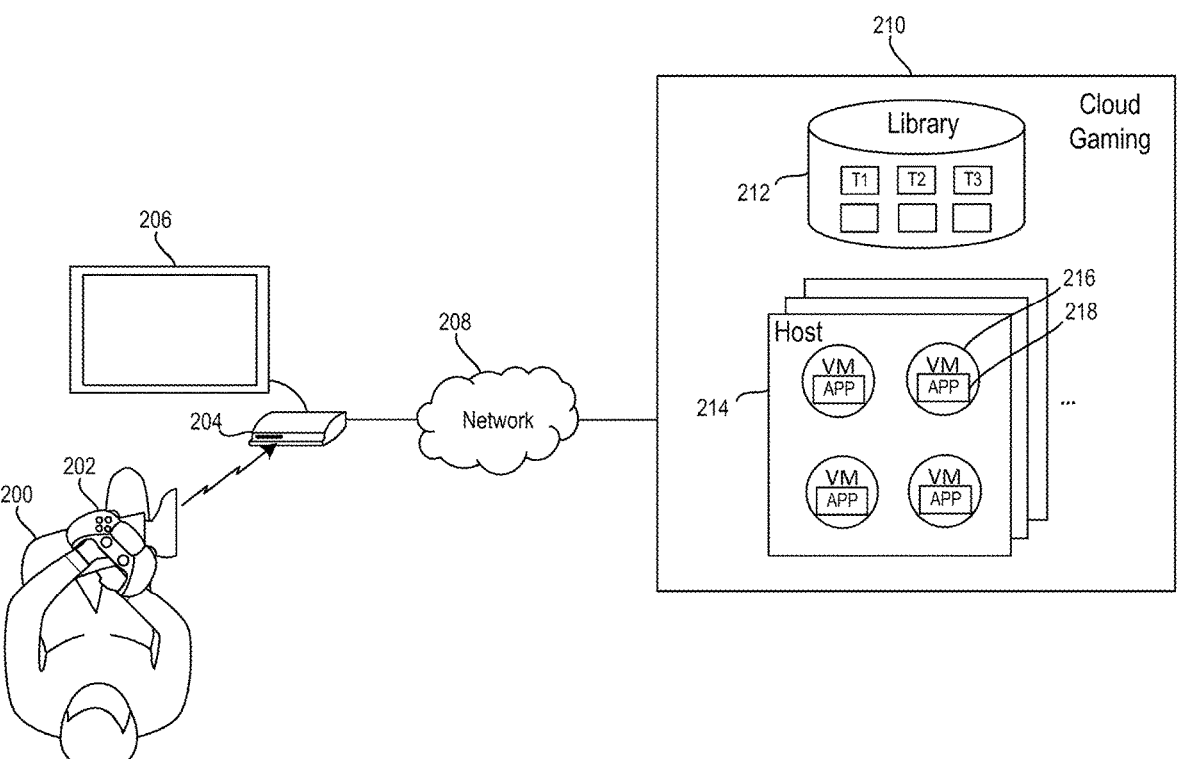
FIG. 2 illustrates a system for cloud gaming.

FIG. 2 illustrates a system for cloud gaming. As shown, a user 200 operates a controller 202 to provide input to a cloud-based video game. The controller 202 can include any of various kinds of input devices, such as buttons, joysticks, a touchpad, a trackball, a VR headset and/or VR controllers, as well as motion sensing hardware, such as accelerometers, magnetometers, and gyroscopes. In one embodiment, the controller 202 can include an illuminated object that can be tracked to determine the location of the controller 202. The controller 202 can communicate wirelessly with a thin game client 204. The client 204 communicates over a network 208 with a cloud gaming service 210. The client 204 processes data from the controller 202 to generate input data that is communicated to a video game executed by the cloud gaming service 210. Additionally, the client 204 receives video data from the cloud gaming service 210, for rendering on the display 206. In one embodiment, the client 204 may process the received video data to provide a video stream in a format compatible with the display 206. In one embodiment, the client 204 can include a camera for tracking a controller device or an object located on the controller device. As has been noted, the object can be illuminated to further facilitate tracking based on analysis of captured image frames from the camera.

The cloud gaming service 210 includes resources for providing an environment in which a video game can be executed. Broadly speaking, resources can include various kinds of computer server hardware, including processors, storage devices, and networking equipment, which can be utilized to facilitate execution of a video game application. In the illustrated embodiment, a video game library 212 includes various game titles. Each game title defines executable code as well as associated data and asset libraries which are utilized to instantiate a video game. The host 214 can be a single computing device that defines a platform for instantiating virtual machines 216. In another embodiment, the host 214 can itself be a virtualized resource platform. In other words, the host 214 may operate over one or more server computing devices, handling the allocation and usage of the resources defined by the server computing devices, while presenting a unified platform upon which virtual machines 216 can be instantiated.

Each virtual machine 216 defines a resource environment which can support an operating system, upon which a video game application 218 can be run. In one embodiment, a virtual machine can be configured to emulate the hardware resource environment of a gaming console, with an operating system associated with the gaming console being run on the virtual machine to support the running of game titles which were developed for that gaming console. In another embodiment, the operating system can be configured to emulate a native operating system environment of a gaming console, though the underlying virtual machine may or may not be configured to emulate the hardware of the gaming console. In another embodiment, an emulator application is run on top of the operating system of a virtual machine, the emulator being configured to emulate the native operating system environment of a gaming console to support video games designed for that gaming console. It should be appreciated that a variety of current and legacy gaming consoles can be emulated in a cloud-based gaming system. In this manner, a user can access game titles from different gaming consoles via the cloud-gaming system.

When the user 200 requests to play a specific video game title, the video game title is retrieved from the library 212. If a compatible virtual machine has not been already instantiated or is not available for use, then a new compatible virtual machine is instantiated on the host 214. In some cases, if a game has not been already instantiated or is not available for use, then a new game can be instantiated on a dedicated host for performance and security reasons. The retrieved video game title is then executed as an application 218 on the available or newly instantiated virtual machine 216. In one embodiment, this can entail determining the appropriate platform for the video game title (e.g., which gaming console or operating system the game requires to run) and assigning the video game title to an appropriate virtual machine for execution, e.g., one having an emulator application capable of handling execution of the video game title. The executing video game communicates with the game client 204 to provide an interactive gaming experience for the user 200. More specifically, the executing video game application 218 receives input data from the client 204 over the network 208. The application 218 processes the input data to update the game state of the executing application. As the game state changes, the application 218 outputs video data that is sent to the client 204 for rendering on the display 206. Additionally, the application 218 may also output feedback data to the client 204 that is utilized to provide an additional feedback mechanism to the user. By way of example, the user's controller 202 may include a tactile vibration feedback mechanism that can be activated based on the output feedback data from the video game application.

In one embodiment, the cloud gaming system is configured to detect the type of client device associated with the user, and also a type of controller available for the user to provide input to the cloud-based video game. For example, in one embodiment, when a user logs in to the cloud gaming system, they may be presented with an option to designate the type of client device with which they are accessing the cloud gaming system. In one embodiment, a series of client device options are presented from which the user may select one corresponding to their client device. The user may also be presented with an option to designate the type of controller device they will use to play a video game. In one embodiment, a series of controller options can be presented to the user, from which the user may select to designate a controller type corresponding to their controller hardware. In other embodiments, the cloud gaming system can be configured to automatically detect the client device type and/or the controller device type.

For example, at the time of login, the client device may send information to the cloud gaming server identifying itself as well as a connected controller device (e.g., in response to a request from the cloud gaming server). Based on this information, the cloud gaming server may determine an appropriate video game output configuration and input parameter configuration to provide a gaming experience optimized for the user's client device and controller device. In one embodiment, a look-up table is employed to determine video game configuration and input parameter configuration based on a detected client device and a detected controller device.

It should be appreciated that a given video game may be developed for a specific platform and a specific associated controller device. However, when such a game is made available via a cloud gaming system as presented herein, the user may be accessing the video game with a different controller device. For example, a game might have been developed for a game console and its associated controller, whereas the user might be accessing a cloud-based version of the game from a personal computer utilizing a keyboard and mouse or a VR headset and associated VR controllers. In such a scenario, the input parameter configuration may define a mapping from inputs which can be generated by the user's available controller device to inputs which are acceptable for the execution of the video game. In some cases, a service may utilize local hardware instead of, or in addition to, running the game on a cloud gaming device 104. In some cases, a cloud gaming device 104 may coordinate between multiple local hardware 101 that are running code for the same gaming session.

In another example, a user may access the cloud gaming system via a tablet computing device, a touchscreen smartphone, or other touchscreen driven device. In this case, the client device and the controller device are integrated together in the same device, with inputs being provided by way of detected touchscreen inputs/gestures. For such a device, the input parameter configuration may define particular touchscreen inputs corresponding to game inputs for the video game. For example, buttons, a directional pad, or other types of input elements might be displayed or overlayed during running of the video game to indicate locations on the touchscreen that the user can touch to generate a game input. Gestures such as swipes in particular directions or specific touch motions may also be detected as game inputs. In one embodiment, a tutorial can be provided to the user indicating how to provide input via the touchscreen for gameplay, e.g., prior to beginning gameplay of the video game, to acclimate the user to the operation of the controls on the touchscreen.

In some embodiments, the client device serves as the connection point for a controller device. That is, the controller device communicates via a wireless or wired connection with the client device to transmit inputs from the controller device to the client device. The client device may in turn process these inputs and then transmit input data to the cloud gaming server via a network (e.g., accessed via a local networking device such as a router). However, in other embodiments, the controller can itself be a networked device, with the ability to communicate inputs directly via the network to the cloud gaming server, without being required to communicate such inputs through the client device first. For example, the controller might connect to a local networking device (such as the aforementioned router) to send to and receive data from the cloud gaming server. Thus, while the client device may still be required to receive video output from the cloud-based video game and render it on a local display, input latency can be reduced by allowing the controller to send inputs directly over the network to the cloud gaming server, bypassing the client device.

In one embodiment, a networked controller and client device can be configured to send certain types of inputs directly from the controller to the cloud gaming server, and other types of inputs via the client device. For example, inputs whose detection does not depend on any additional hardware or processing apart from the controller itself can be sent directly from the controller to the cloud gaming server via the network, bypassing the client device. Such inputs may include button inputs, joystick inputs, embedded motion detection inputs (e.g., accelerometer, magnetometer, gyroscope), etc. However, inputs that utilize additional hardware or require processing by the client device can be sent by the client device to the cloud gaming server. These might include captured video or audio from the game environment that may be processed by the client device before sending to the cloud gaming server. Additionally, inputs from motion detection hardware of the controller might be processed by the client device in conjunction with captured video to detect the position and motion of the controller, which would subsequently be communicated by the client device to the cloud gaming server. It should be appreciated that the controller device in accordance with various embodiments may also receive data (e.g., feedback data) from the client device or directly from the cloud gaming server. In some cases, data from input devices can be processed by a local computing device, which can then provide the results of that processing instead of, or in addition to, all or part of the raw data. Transmitting the result of processing can significantly reduce the bandwidth of data that needs to be transmitted. For example, eye tracking sensor data can be processed to determine the results of that processing, such as focus point on the display, displayed object focused on, blinking, eye opening amount, rate of eye movements, and/or determined emotions. As another example, data from a video camera can be analyzed to identify gestures made by the user. The identified gestures can be transmitted to the cloud while access to the raw data from the video camera can be limited to just the local computing device. In some cases, transmitting the result of processing raw data from user input devices instead of the raw data can result in better privacy for the user.

Figure 3:
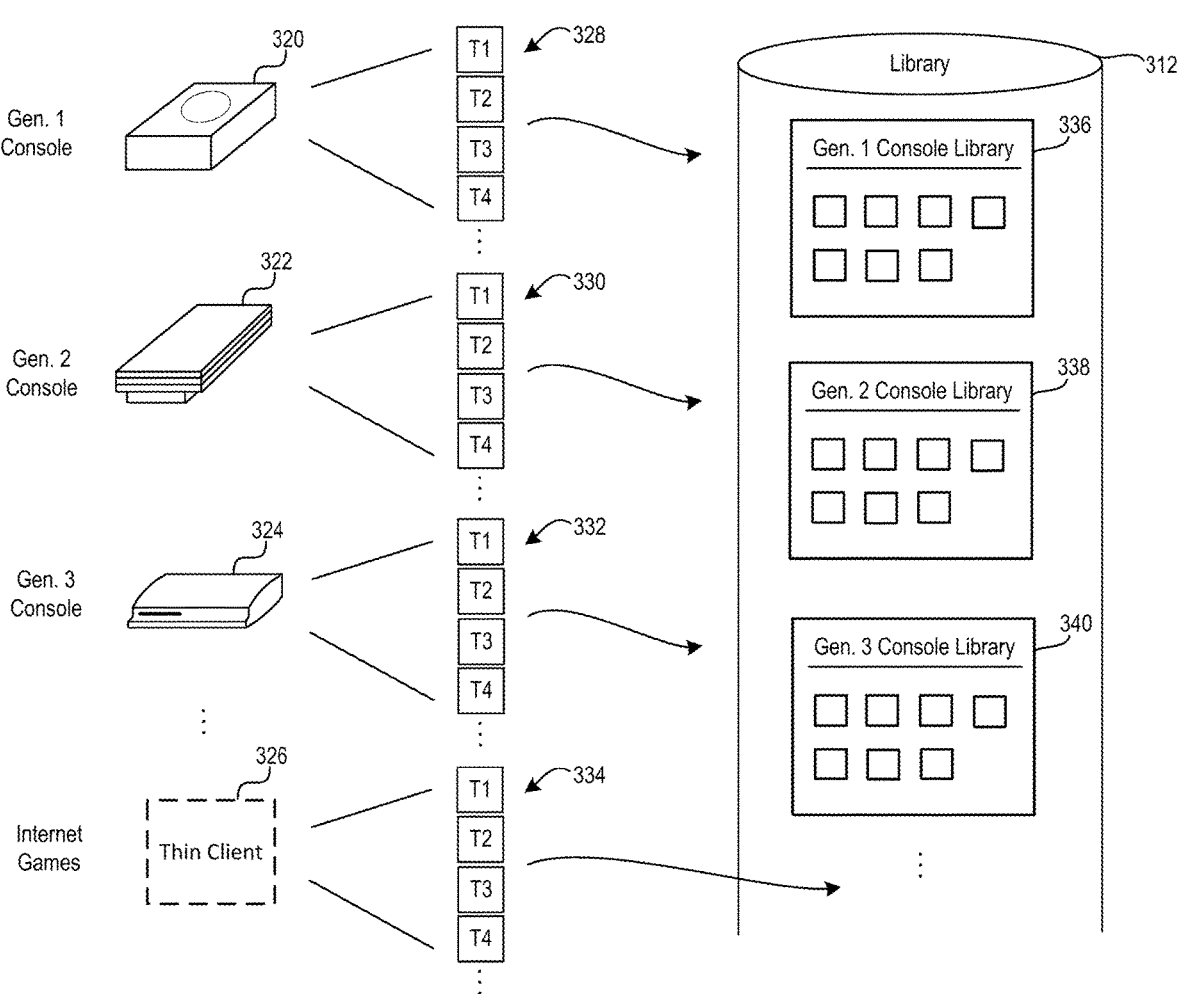
FIG. 3 illustrates the accumulation of game titles across various generations of gaming consoles.

FIG. 3 illustrates the accumulation of game titles across various generations of gaming consoles. In the video gaming industry, video games are developed for specific video game consoles. Over time a library of game titles is amassed for a specific game console. For example, in the illustrated diagram, a first generation console 320 has a collection of game titles 328 which have been developed for it. A second-generation console 322 has associated there with a collection of game titles 330 which have been developed for it. And a third-generation console 324 is also shown, having a collection of game titles 332 developed for it. In other embodiments, there may be a collection of game titles 334 which have been specifically developed as cloud-based games for use in conjunction with a client 326. Furthermore, other types of games such as Internet games can be developed and collected for distribution over a cloud gaming system, as is described herein. It will be appreciated that game titles from different generations of game consoles can be collected and consolidated in the cloud gaming library 312. As shown, the library 312 includes a first generation console library 336 which includes the game titles which have been developed for the first generation console 320. In a similar manner, the library 312 also includes a second-generation console library 338 and a third generation console library 340 which contain video games that have been developed for the second and third generation consoles, respectively. Games which have been developed for the client 326 and other types of games such as Internet games can also be included in the game library 312. As can be seen, many game titles from across various generations of video gaming consoles can be amassed and made available via a cloud gaming library. As has been described, each of these games can be executed on a virtual machine that simulates the operating system environment associated with a given gaming console for which a game was developed. In this manner, users accessing the cloud-based gaming system can easily access and play games from across many different consoles as well as games from other contacts such as Internet games and games which have been specifically developed for use with the cloud-based gaming system. Some console generations may have the capability to play games that were created for another console generation or another gaming system. Some game titles may be targeted to be playable on multiple console generations or multiple gaming systems. Some game titles that are not owned by the player may be temporarily available for the player to play, such as through a subscription, demo, or limited use game fragment.

Figure 4A:
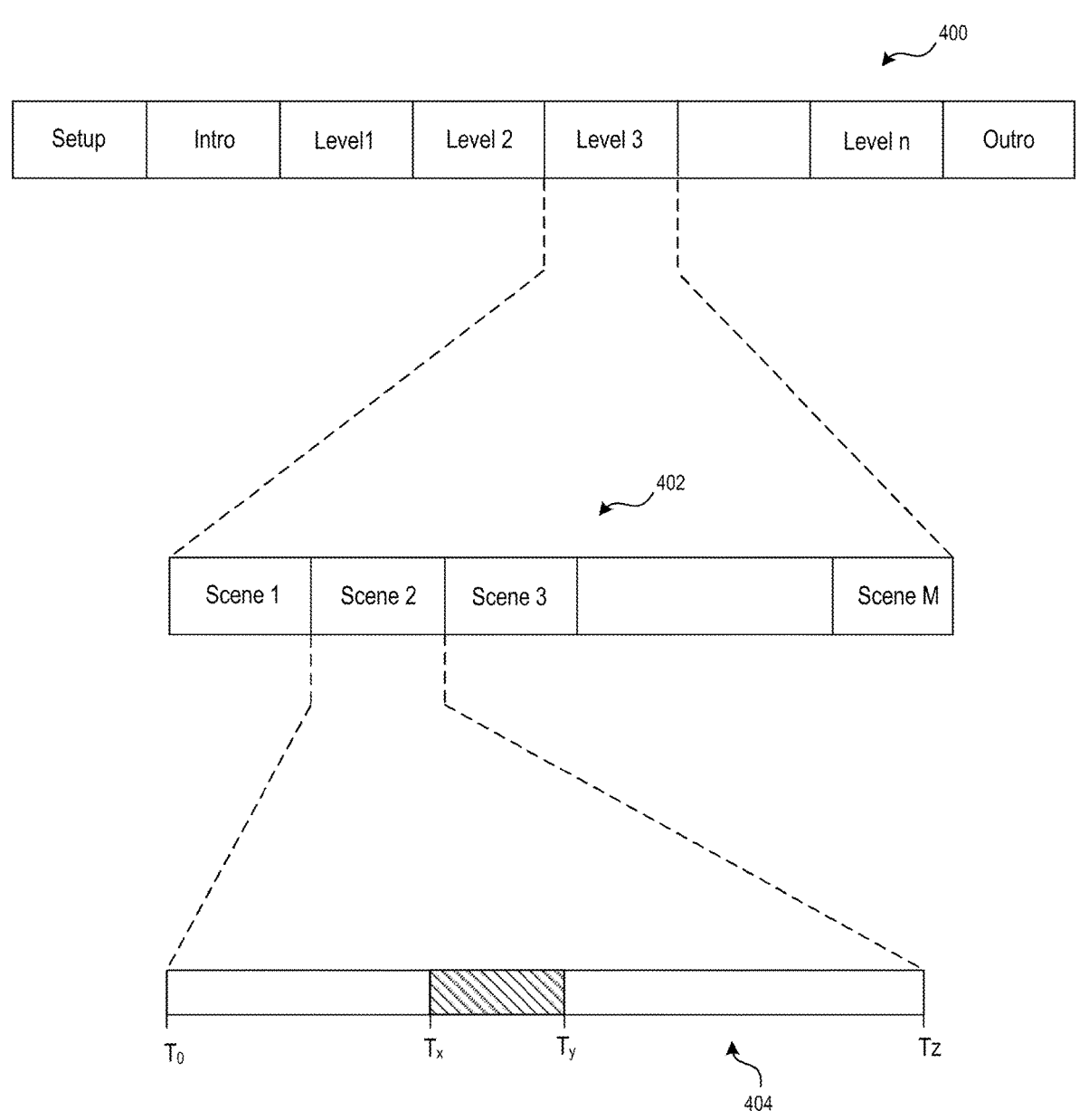
FIG. 4A illustrates the hierarchical organization of various portions of a video game.

FIG. 4A illustrates the hierarchical organization of various portions of a video game. By way of example, a video game can be organized into various sections 400. In the illustrated embodiment, these may include a set up section, an introduction section, various level sections, and an outro section. A given level may be further divided into various scenes. As shown, the level 3 section is broken down into various scenes 402. In some cases, a game level may be hierarchical, containing other game areas. For example, a game level may contain a continent, which may contain a town, which may contain a magic shop, where each of those nested game levels may contain scenes. As the user plays through a given scene, a gameplay timeline of that scene can be recorded, including recorded video of the user's gameplay as well as recorded input data and game states (e.g., variables) of the executed game application. In the illustrated embodiment, the gameplay timeline 404 is representative of the user's gameplay of scene 2 of level 3 of the game. In some cases, the game play opportunities available to play are different in different game areas, levels, times, or other game fragments, such as puzzles, combat challenges, or crafting. The game play opportunities available may differ based on the game state when playing the particular portion of the game, such as the chosen character class, guild membership, previous NPC interactions, items equipped, the character's inventory, or skills learned by the character. In some cases, game fragments can be identified based on activities preferred by a player and what game fragments and game states provide those activities.

In one embodiment, a user may select portions of their recorded gameplay from which to generate a minigame or game fragment. For example, in the illustrated embodiment, the gameplay timeline 404 has a start time $T_0$ and an ending time $T_z$. A portion of the gameplay timeline from a time $T_x$ to a time $T_y$ has been selected from which to generate a minigame. In some cases, games provide the player with a choice of activities to do or areas to explore. In such a case, scenes 402 and/or portions of the gameplay timeline 404 can be identified and used to create one or more playable game fragment that will provide the player with the game play activities and/or areas they are likely to enjoy.

Figure 4B:
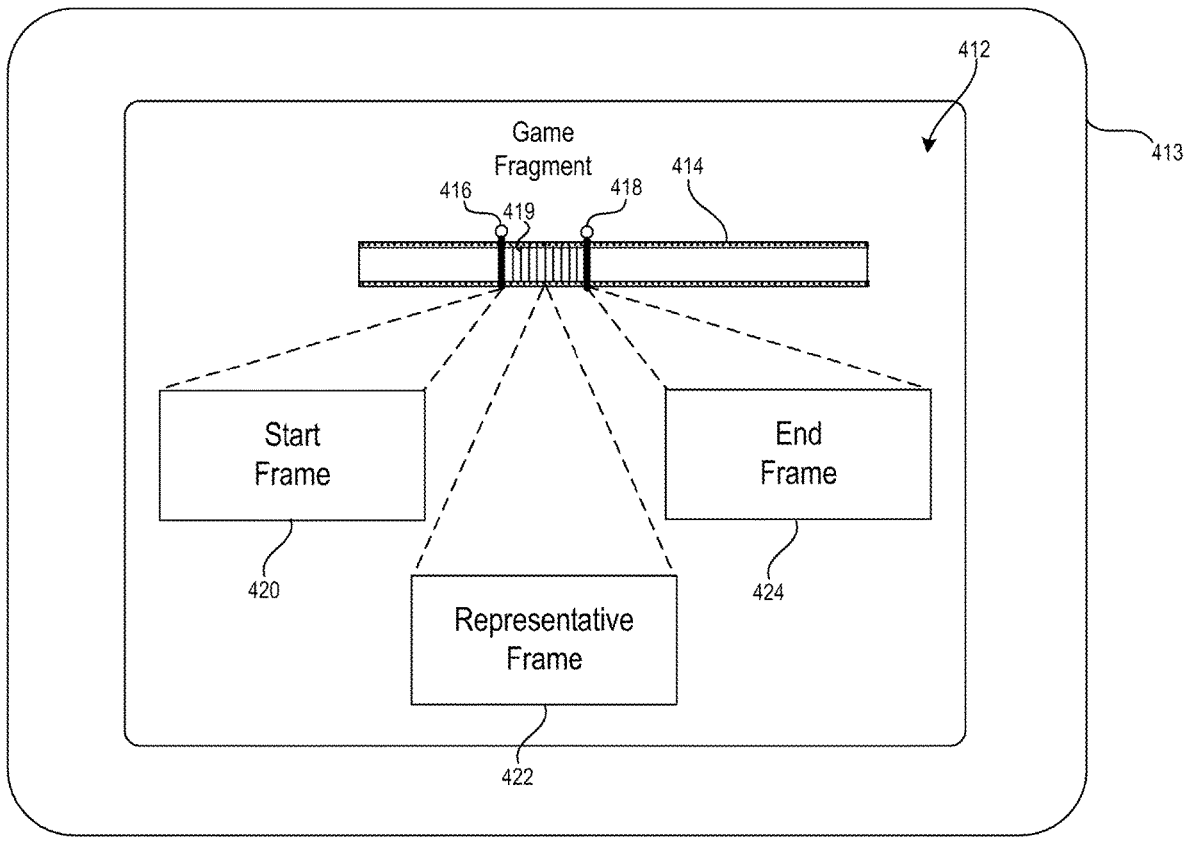
FIG. 4B illustrates an interface for selecting a portion of a gameplay timeline for generation of a game fragment or minigame.

FIG. 4B illustrates an interface for selecting a portion of a gameplay timeline by a user for generation of a minigame or game fragment. In the illustrated embodiment, the interface 412 is presented on a touchscreen of a device 413, such as a tablet computing device. However, in other embodiments, the interface 412 could be presented on a television, VR headset, or other display device. The interface 412 includes a selectable gameplay timeline 414. The gameplay timeline 414 is represented as a film strip with adjustable markers 416 and 418. The marker 416 designates the start point along the gameplay timeline 414 of the selection, whereas the marker 418 designates the endpoint along the gameplay timeline of the selection. Furthermore, a marker 419 can be positioned within the portion of the gameplay timeline 414 that has been founded by the start marker 416 and the end marker 418. For ease of use and to provide the user with a visual understanding of what portion of their gameplay is being selected, a start frame 420 can be shown corresponding to the point along the gameplay timeline at which the marker 416 has been positioned. The start frame 420 is an image of the recorded gameplay video corresponding to the time at which the start marker 416 is positioned. Likewise, a representative frame 422 is an image of the recorded gameplay video corresponding to the time at which the marker 419 is positioned. In a similar manner, the end frame 424 is an image of the recorded gameplay video corresponding to the time at which the end marker 418 is positioned. The representative frame 422 can be utilized as a representative image for the game fragment that is created based on the selected portion of the gameplay timeline 414. Although a touchscreen interface is provided and described, in other embodiments, various other kinds of input can be utilized to select starting and ending points to define a portion of gameplay for creation of a game fragment. For example, input can be provided via a game controller, a keyboard, VR controller, gesture input, voice input, and in accordance with other types of input devices and mechanisms to enable selection of a portion of gameplay along with selection of a representative image frame from the recorded gameplay video.

In some embodiments the selection markers may not be continuously adjustable along the gameplay timeline but may be configured instead to snap to pre-defined time points along the gameplay timeline. For example, predefined time points may be defined to correspond with specific events occurring in the gameplay timeline. The specific events of a given gameplay timeline for which predefined time points will be assigned can be generated based on analysis of the users gameplay and will depend on the specific architecture of the video game gameplay. In one embodiment, predefined time points can be assigned based on geographical location of a character within a virtual world defined by the video game. For example, predefined time points can be assigned to the specific times at which a character moved from one geographical locale to another geographical locale, e.g., movement from one scene location to another scene location, movement from one city to another city, entering a structure, entering a room within a structure, entering the vehicle, entering a different type of environment, or any other kind of geographical transition of significance. In another embodiment, predefined time points can be assigned based on development of a user's character or entity which is controlled in the video game. For example, predefined time points can be assigned when a character or entity controlled by the user accomplishes a task, acquires a skill, acquires an object, passes a level or otherwise completes a portion of the video game, or performs or achieves any other kind of significant activity in the video game. In some cases, a playable game fragment may begin when an event in-game is triggered, such as the appearance of a boss monster, the player triggering a trap, or an earthquake occurring.

Figure 5:
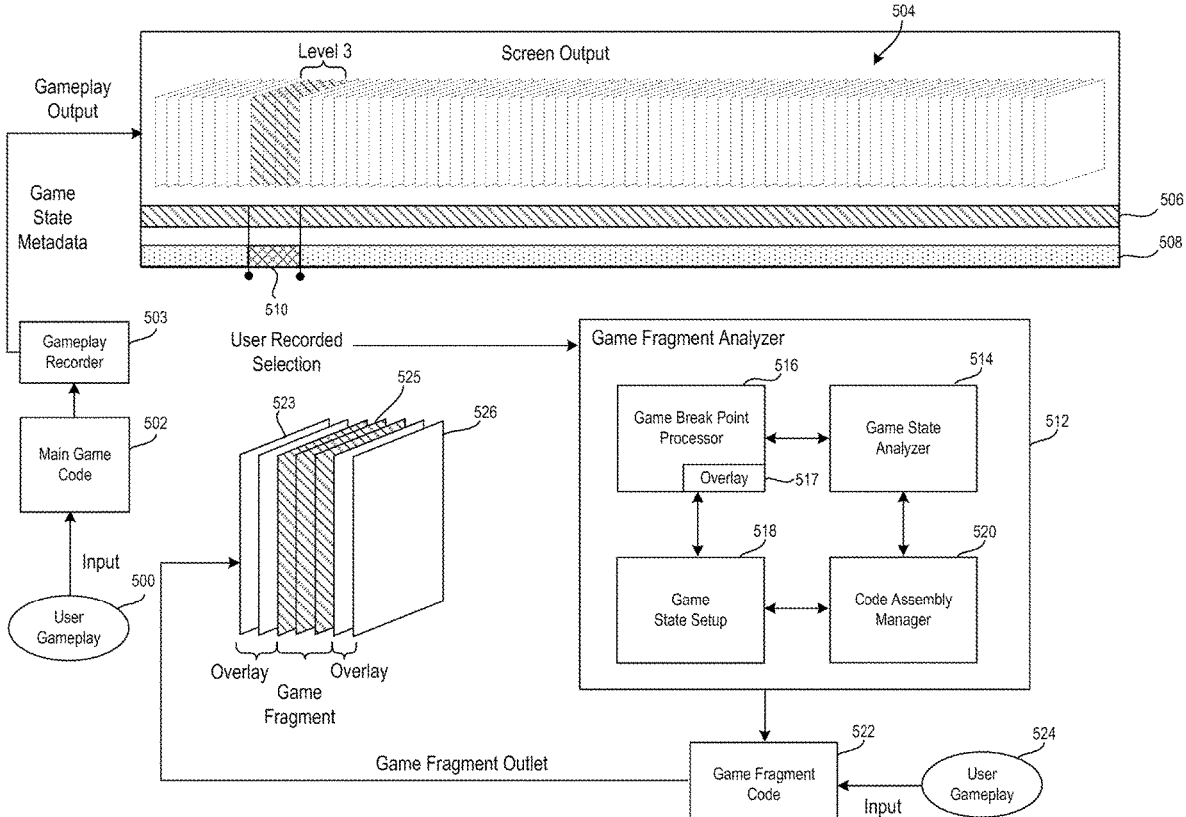
FIG. 5 illustrates a system for generating game fragment code for a playable minigame.

After a user has selected a portion of gameplay from which to create a game fragment, a playable minigame based on the selected portion of gameplay may be created, as described in further detail with respect to FIG. 5. More specifically, the game fragment enables the user or another user to replay or play substantially the same portion of the video game later, and possibly under substantially the same conditions and parameters. In this sense, the game fragment is more than simply a replay video of the original user's gameplay, but is a playable portion of the video game, itself. A subsequent user may thus experience a substantially similar gameplay experience to that of the original user without having to play through the video game in a linear fashion. In some cases, a subsequent user may experience a similar gameplay experience to that of the subsequent users in a non-linear fashion; the user may replay or play a game fragment from any of the predecessor or subsequent users.

FIG. 5 illustrates a system for generating game fragment code. The terms game fragment and minigame are used interchangeably herein to define a discreet and playable portion of a video game that is generated from existing recorded gameplay. In the illustrated embodiment, the user gameplay 500 conceptually represents a user interacting with a full version of a video game. The user could be a human player or, in some embodiments, an AI player that plays the video game in a sequential fashion from the beginning.

Main game code 502 is executed to define the full version of the video game. As the video game is played, it generates various types of gameplay output, including video data, game state data, and user input data. These can be recorded by a gameplay recorder 503 to define the user's recorded gameplay. In the illustrated embodiment, an image stream 504 conceptually represents the video data output by the video game. Game state data 506 and user input data 508 are also shown. The game state data 506 includes data defining the game state of the executing video game from moment to moment during gameplay. In some cases, the game state data can allow starting game play for a game fragment at a finer level of specificity than pre-defined starting points, up to being able to choose any frame of the recording in which to start playback. The game play can begin using the same game state that existed during the recorded game play or may be modified in the generation of a game fragment. In some cases, game state data from locations other than the starting point for a game fragment can be included in the game fragment to provide game play of the game fragment that more closely matches the game play in the recording. For example, if the player opens a chest in the selected portion of the recording 510 and the chest contains items randomly determined by the game when the chest is opened, that random determination can be included in the game state and used in the game fragment. In other words, if the player opens the same chest during play of the game fragment, the items chosen to be in the chest when they open it will be the same items that were chosen during the recorded game play.

The user input data is data generated by capturing user initiated actions occurring during interactivity with the video game, such as may be provided via activation of input devices on controller devices, detection of sensor data (e.g., motion sensors), captured audio input, and the like. In some cases, the user input data may contain data from user interactions with things other than the video game, such as the user's interactions with a different game title or preferences the user specifies in a game system user interface.

Game state data can include the values of any variables which define the execution state of the video game. For example, the game state data may include position variables indicating the X, Y, and Z positions of an object in a virtual space of a video game such as a character or a vehicle. Camera angle variables indicate the direction of a virtual camera or virtual view in the video game. In one embodiment, the camera angle is defined by an azimuth component measured (e.g., along a horizontal plane) relative to and azimuth reference and an inclination component measured relative to an inclination reference (e.g., relative to vertical). Action variables indicate the initiation and sustaining of various actions within the video game. It should be appreciated that actions for a given video game will be specific to the context of the video game. By way of example, actions could include the initiation of specific maneuvers, the application of skills, the triggering of modification mechanisms that modify an existing action such as increasing its level of intensity or frequency, etc., or any other type of action or activity that can be triggered by user input during the course of the video game. A weapon variable indicates the triggering of a weapon the video game. A health variable indicates a level of health of, for example, a user's character in the video game. Button variables indicate the state of buttons on a controller device, e.g., whether the button is in a depressed state or in a released statement. Joystick state variables in the illustrated embodiment indicate a magnitude of movement of a joystick relative to a neutral position. The foregoing game state variables are merely exemplary, and it will be recognized by those skilled in the art that many other types of game state variables can be tracked over time As has been described, a user interface can graphically depict the user's recorded gameplay to facilitate selection by the user of a portion of the user's gameplay from which to generate a game fragment. In the illustrated embodiment, the user has defined a selection from their recorded gameplay representing a game fragment 510. This selection of the user's recorded gameplay is utilized by a game fragment generator to generate game fragment code 522 which defines a limited game based on the selected portion of the user's gameplay. The game fragment generator 512 includes a game state analyzer 514, which analyzes the game state of the game fragment 510. Based on the analysis of the game state of the recorded selection, a game breakpoint processor 516 determines appropriate breakpoints to define the beginning and ending of the game fragment. Breakpoints can be defined based on geography, time, task or goal accomplishment, scene boundaries (physical or temporal), or any other aspect of a video game according to which the video game's gameplay can be segmented to generate a game fragment. A brief description of some illustrative embodiments will serve to highlight certain possibilities for breakpoint determination.

For example, some video games entail control of a character that can be moved from one geographic scene or locale to another scene or locale. The selected portion of the user's gameplay may be determined to be generated from gameplay at a particular scene. In such an embodiment, the boundaries of the particular scene can define the geographic breakpoint for the game fragment, selecting the scene to the exclusion of other scenes, which can entail exclusion of other adjacent or adjoining scenes, as well as scenes which are non-adjacent or non-adjoining or otherwise less related or unrelated to the particular scene. It should be appreciated that the game fragment 510 may entail gameplay from multiple scenes, in which case, the game breakpoint processor 516 may be configured to define breakpoints according to the boundaries of the multiple scenes which are utilized for the recorded gameplay selection. In some cases, the selected game fragment 510 is used to create a playable game fragment that limits game play to the portion of the game that was played in the selected game fragment. In some cases, the playable portion of a playable game fragment created based on a selected game fragment 510 can include portions of the game other than portions that were played in the selected game fragment 510. In one example, the playable game fragment can be used as a starting point for game play that allows access to all of the game title. In another example, the game fragment will allow playing the portion of the game that was played along with other related game content, such as game content that would have been played in the game state getting to the game fragment, adjoining game locations, the remainder of any game level included in the game fragment, or time-based restrictions. In some cases, multiple selected game fragments 510 can be used in the generation of a single playable game fragment, such as to create a game fragment that allows access to the game play done in the multiple game fragments 510.

It should be noted that a scene can be based on data that is geographic, temporal, and/or game state in nature. That is, the scene may not only define a geographic region within a virtual space defined by the video game but may also be configured to exist during a certain time or at a particular chronological point within the larger context of the video game. Such a scene may have game aspects that are determined by game state data, such as if the player is a member of a guild, performed a particular action previously, or the items the player has equipped. Such a scene may have defined objectives or goals that are to be accomplished by the player. Thus, game breakpoints can be defined based on chronology or other temporal aspects as defined by the video game.

Furthermore, a given scene may have associated objects or features which are presented as part of the scene during gameplay. These objects or features may be analyzed to define further breakpoints according to their inclusion. For example, the objects in the scene may be taken from a subset of an asset library, in which case the subset of the asset library can be defined for the game fragment by the game breakpoint processor 516, to the exclusion of other objects in the asset library which are not utilized in the scene(s) associated with recorded gameplay selection. Objects and features can be dynamic elements of a given scene, with associated mechanisms defining their change in response to events occurring in the video game. For example, an object might have a damage modeling module that determines and adjusts the appearance of the object when it is damaged (e.g., when struck by a weapon). A feature could be a vehicle that is made available during the scene, with the vehicle having associated logic which defines its appearance during gameplay as well as its operation and response to user input. Such logic or damage modeling can further define game breakpoints for generation of the game fragment.

Various aspects of a video game which define or are otherwise utilized for a selected portion of a video game can be the basis for defining a game breakpoint. The presently described examples are provided by way of example only and not by way of limitation. It should be appreciated that in other embodiments, other aspects of a video game can form the basis for defining breakpoints to generate a game fragment.

In one embodiment, a video game may be organized into various scenes, which normally must be completed in a linear fashion, such that a later scene cannot be attempted until its preceding scene has first been completed. Each scene can include a number of objectives or goals, some of which may be required for completion of the scene, and some of which may be optional for completion of the scene. Objectives can include navigating from a starting location to a predefined ending location within the scene, surviving for a predefined length of time, destroying a predefined number of enemies, acquiring a certain number of points, defeating a particular enemy, solving one or more puzzles, and/or any other activity which can define an objective within the game. A scene may have various predefined completion points, that is, points wherein the user, once having achieved the completion point, is able to return to that point if the user becomes unable to continue gameplay for some reason (e.g., the user quits the game, the user's game character dies or runs out of lives or health, the user's vehicle crashes, etc.). At predefined completion points, a video game may be configured to automatically save the user's progress or present an option for the user to save their progress.

In one embodiment, the game breakpoint processor 516 is configured to define a game breakpoint at predefined completion points. In one embodiment, this is accomplished by finding the nearest completion points to the selected start and end points of the user's recorded gameplay selection, and utilizing these nearest completion points to define the game breakpoints for the game fragment. In another embodiment, the nearest completion point occurring before the selected start point of the recorded gameplay selection is utilized to define a starting breakpoint, whereas a nearest completion point occurring after the selected end point of the recorded gameplay selection is utilized to define an ending breakpoint for the creation of the game fragment. In still another embodiment, if a completion point lies within a predefined radius of (e.g., either before or after) either of the start or end points of the user's recorded gameplay selection, then that completion point is utilized to define a corresponding start or end game breakpoint for the game fragment. Whereas if no completion point lies within the predefined radius, then a game breakpoint is defined that more closely matches the user's selected start or end point for the recorded selection. In other embodiments, the predefined radius for the start and end points may differ for purposes of determining whether to utilize an existing completion point to define a game breakpoint.

As has been discussed, the game breakpoint processor 516 determines appropriate breakpoints applicable to various aspects of the video game based on analysis of the recorded gameplay selection. The breakpoints defined by the processor 516 serve to define the limited scope of the game fragment that will be produced based on the recorded gameplay selection. In one embodiment, an overlay processor 517 is provided for generating overlays that may contribute to an improved user experience when playing the game fragment generated by the game fragment generator 512. For example, in one embodiment the overlay processor 517 defines pre-game fragment data which defines video or gameplay or additional information that can be provided as an introduction to the game fragment prior to actual gameplay of the game fragment. One example of pre-game fragment data is an introductory video which can provide context to a user who initiates gameplay of became fragment. In another embodiment, pregame fragment data can define introductory gameplay for the game fragment, which may provide a user an opportunity to learn skills that may be useful or required for playing game the fragment. In another embodiment, pregame fragment data may define a series of one or more informational screens or images which provide information about the game fragment to the user. Such information may include controller configuration, story background information, objectives or goals, maps, or any other type of information relating to the game fragment which may be useful for the user or otherwise improve the user's experience of playing the game fragment.

The overlay processor 517 can also be configured to define postgame fragment data. In some embodiments, the postgame fragment data can define video or images to be shown following completion of game play of the game fragment. For example, a congratulatory video might be shown after a user completes the game fragment. Such a video may be customized based on the user's gameplay of the game fragment, for example, by showing information or images that are based on the user's gameplay. In one embodiment, the postgame fragment data can define a playback mechanism to play recorded portions of the user's gameplay of the game fragment following its completion. In another embodiment, the postgame fragment data can be configured to display statistics about the gameplay of the game fragment and may indicate a comparison of the gameplay to that of other users or that of the original creator of the game fragment. In still other embodiments, the postgame fragment data can define additional interactive elements to be presented to the user upon completion of the game fragment. These may include options to purchase in part or in whole the video game upon which the game fragment is based, redirect options to additional sources of information relating to the video game, etc.

In some embodiments, the overlay processor 517 can be configured to define elements which are overlaid into the game fragment. These may include elements that may be customized by a user playing the game fragment, such as customization of characters, objects, properties, and other types of customization options. In some embodiments, the overlay processor 517 may be configured to define simplified elements for a game fragment to reduce the complexity of the game fragment code and the amount of resources required to execute the game fragment. By way of example, many video games include artificial intelligence (AI) entities such as characters, vehicles, enemies, etc. These AI entities may in the full video game be governed by artificial intelligence models that define the reaction and activity of the AI entities based on events occurring in the video game. However, in the context of a game fragment which is of limited scope, it may be acceptable to simply define the activity of an AI entity through hardcoded definition or simplified extrapolations, rather than fully modeling the activity of the AI entity as would be the case in the full video game. In some cases, modifications may be made to a game fragment before it is played. For example, a player may be allowed to change how the character is equipped before starting play. As another example, AI might modify the game state for the fragment to optimize the game play that will result when playing the game fragment to be more likely to align with the player's game play preferences. Another example would allow a player to modify a character's appearance before playing the game fragment. A player may be allowed to modify other portions of the game state, such as the options chosen the last time the player interacted with an NPC or how the player chose to spend points when leveling up the character. In some cases, a game state, or portions of the game state, from one or more other game fragment or portion of a game recording can be used to alter the game state in a game fragment before it is played, such as to replace the character in a game state in the game fragment with the character from a different game state. The entire game state may be replaced before playing a game fragment.

For example, if in the recorded gameplay selection of the full video game a given AI character moves in a certain manner according to its AI model that is unlikely to change in the game fragment, then it may be more efficient to define an approximation of the AI character's movement for the game fragment. Such an approximation would not require the full AI model to be included as part of the game fragment code, yet would provide to the user playing the game fragment a substantially similar experience with respect to that AI character to that of the original user's gameplay from which the game fragment was generated. The resource savings realized through approximation of AI entities activity can be even more significant when multiple AI entities are present and interacting in the user's recorded gameplay selection. For each of the AI entities may have AI models that depend upon the output of those of the other AI entities. However, when gameplay has been recorded the activity of each of these AI entities is known, and therefore can be reproduced in the game fragment through simplified mechanisms such as direct encoding of their controlling variables and approximation of their activity.

With continued reference to FIG. 5, a game set up state processor 518 is provided for defining an initial state of the game fragment. Based on the operation of the game state analyzer 514, the game breakpoint processor 516, and the game set up state processor 518, a code assembly manager 520 assembles various code portions to define the game fragment code 522. When the game fragment code 522 is executed, user gameplay 524 provides input to define the state of execution of the game fragment code, which produces gameplay output including video data and feedback data for rendering the game fragment to the user. The video data can include pregame fragment overlay video 523, game fragment video 525 which is the video resulting from gameplay of the game fragment, and postgame fragment overlay video 526.

It should be appreciated that in one embodiment, the game fragment code 522 is fully self-contained, including all code portions which are required to execute the game fragment. However, in other embodiments, the game fragment code 522 may incorporate references or pointers to existing code portions in the main game code of the full video game. Furthermore, the game fragment code 522 may include reference or utilize existing assets in asset libraries of the main game code of the full video game. However, in other embodiments, new asset libraries can be generated for the game fragment code.

In one embodiment, the game state analyzer 514 can be configured to analyze the game state data 506 of a user's recorded gameplay. Based on the analysis of the user's recorded gameplay, various regions of interest of the user's recorded gameplay can be defined and presented to the user as possible selections from which to generate a game fragment. For example, a region of gameplay characterized by high levels of activity for certain game state variables might define a selection of the user's recorded gameplay. It should be appreciated that the level of activity for a given game state variable can be based on various factors such as a level of intensity, a frequency of activation, a number of replays, etc. In some embodiments, the analysis of the game state variables can entail searching for regions of gameplay wherein the levels of activity of two or more different game state variables are correlated in a predefined manner, e.g., the two or more variables have high levels of activity simultaneously. A high level of activity can be determined based on a predefined threshold. In certain embodiments, a frequency or intensity of live (contemporaneous) feedback from a user (e.g., audible feedback).

In various embodiments, a region of interest of the user's recorded gameplay may be automatically determined based on threshold detection of any one or more of the following: one or more user inputs, rate of user input, frequency of input, repeats of types of inputs, occurrences of input patterns, combination inputs (e.g., combo keys), motion vectors, pressure exerted on a controller, and/or implicit feedback, e.g., excitation of a user based on captured image or audio data of the user. Another type of feedback from the user can be utilized, such as the amount of time spent playing aspects of the game (including different game areas or different types of play), like crafting vs. hunting monsters, ratings given by the user (which may be detailed to aspects of their game play or game play recordings), analysis of the player activity in an area compared to activities enjoyed by the player, or determinations, which can be generated by AI analysis, of the amount of enjoyment the player has for particular game play experiences or game aspects. Other types of feedback may be inferred from subsequent users that play that game fragment, including their own feedback (as mentioned above) in term of similarities and variances. The variance range can be statistically calculated to arrive at a score of user's interest.

Figure 6A:
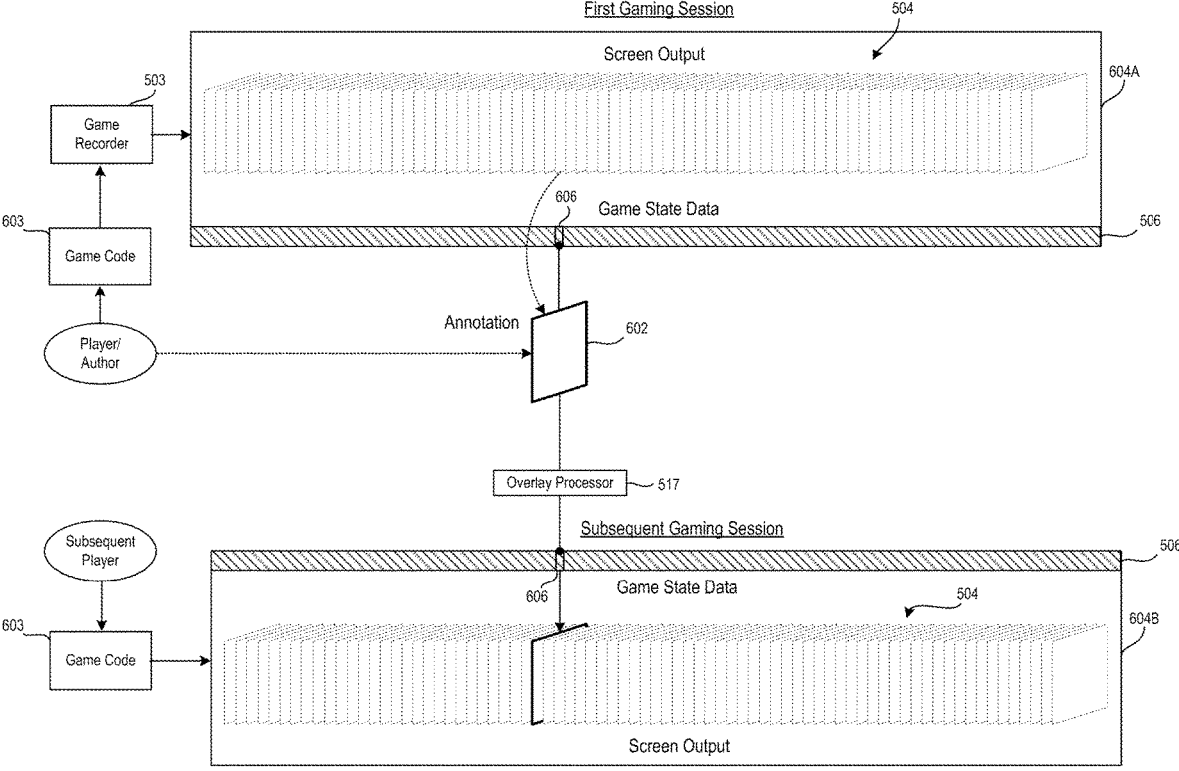
FIG. 6A illustrates a process of annotating recorded gameplay.

FIG. 6A illustrates a process of annotating a recorded gameplay session to produce an annotation 602 capable of being presented at a selected point in a subsequent gameplay session. The annotation 602 may be created by a player playing a particular game or game fragment (e.g., game code 603), another player, or an automated process. In some cases, annotations may be contributed by spectators watching game play, or analysis of behavior of spectators watching game play, which may be done by artificial intelligence (AI).

As illustrated, the player's gameplay in a first gaming session 604B is recorded by a gameplay recorder 503, as described in relation to FIG. 5. The recorded gameplay includes screen output 504 and game state data 506 generated by processing user input data. The game state data 506 includes set of variables relating to the gameplay, such as, without limitation, a current section, scene, level, temporal location, or spatial location within the video game, one or more attributes of a character within the video game, including gaming statistics, achievements won and/or problems solved, the location and status of various non-player characters (NPCs) within the game, and/or the like.

An annotation 602 may include video, audio, graphics, text, highlighting, and/or metadata, which may be supplied by the creator of the annotation 602 (i.e., its "author"), taken from the screen output 504 and/or game state data 506, provided by a game developer, and/or created by an automated process. The metadata may include some of the game state data 506, which may be used to subsequently launch the game at a different point, as described in greater detail below. The metadata may also include screen coordinates to facilitate on-screen highlighting and/or positioning of the video, text, graphics, and/or highlighting of the annotation 602 on a display screen. In some cases, game state data may include information received from the game title in addition to the output rendering of the game play, such as current score, position on the map, or player health. In some cases, game state data may be derived from analysis of the game rendering output, which may include artificial intelligence (AI) analysis, to determine things from the game rendering output, such as player health, enemy health, ammunition level, how the character is equipped, or enemies the player is engaged with.

The annotation 602 may be linked to or associated with a particular point or segment of the game, which may be defined by a particular game state 606, i.e., a subset or instance of the changing game state data 506 in the recorded gameplay session. As described in greater detail hereafter, once an annotation 602 is linked to a point within the video game, the annotation 602 may be presented (e.g., displayed, played, executed) when the game code 603 is played in a subsequent gaming session 604B in response to one or more triggering conditions. For example, a video or text annotation 602 may be overlayed on the subsequent gaming session 604B and/or screen output 504 of the subsequent gaming session 604B may be wholly or partially replaced with the annotation 602. In some embodiments, this may be accomplished by means of the overlay processor 517 discussed in connection with FIG. 5 or using a different module that is part of, or operates in concert with, the game code 603 or the game operating system.

The triggering condition may include that a second player plays the game code 603 to the same point in the subsequent gaming session 604B, such that at least some of the game state 606 of the subsequent gaming session 604B matches at least some of the game state 606 of the first gaming session 604A to which the annotation 602 was linked. For example, if the annotation 602 is associated with a game state 606 in which a level variable is set to level 3, the triggering condition may include that the level variable transitions to level 3 in the subsequent gaming session 604B.

The triggering condition may also include the second player choosing to see the annotation 602 after being prompted that the annotation 602 is available. In other words, presentation of the annotation 602 might not be automatic. Rather, the second player may receive a notification during the subsequent gaming session 604B that an annotation 602 is available. The notification could be audible (e.g., a sound), visual (e.g., an displayed icon), haptic (e.g., a vibration in a game controller or VR headset), and/or the like. The second player may signal a desire to have the annotation 602 presented by activating a designated control on the game controller or selecting from an on-screen menu. Of course, the triggering condition may be significantly more complex and may involve any number of variables or states within the game state data 506 and include combinatorial logic.

The annotation 602 may be presented only for the author, for a different player that plays the video game, or particular players under select conditions. As an example, a subsequent player might need to subscribe to the author's annotations 602 in order for the annotation 602 to be displayed. Alternatively, the author may need to share the annotation 602 (or a link thereto) with the subsequent player and/or otherwise enable the subsequent player to unlock the annotation 602 in order for it to be presented in the subsequent gaming session 604B.

Figure 6B:
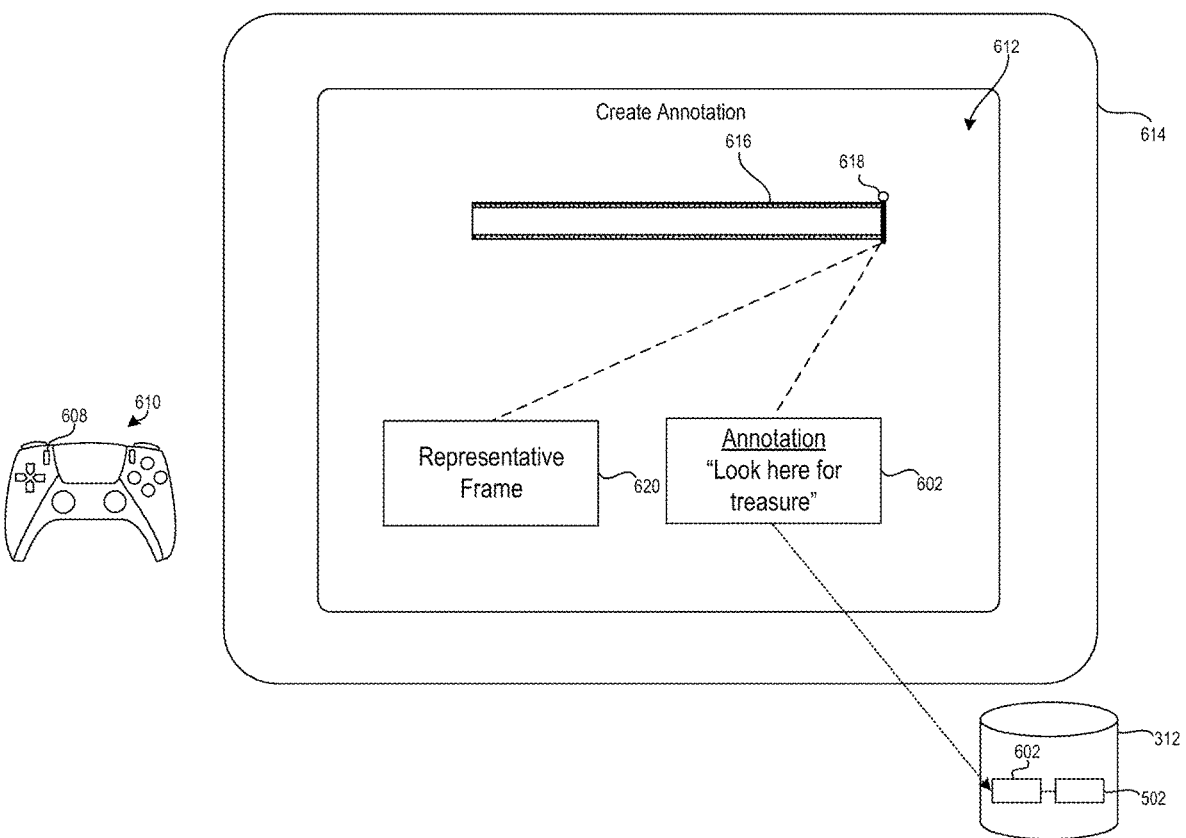
FIG. 6B illustrates a user interface for annotating recorded gameplay.

In one embodiment, the annotation 602 may be created while the author is playing the first gaming session 604. For example, as shown in FIG. 6B, the author may press a share button 608 on a game controller 610, which may temporarily pause the video game and display a menu (not shown) from which the player may select an option for creating the annotation 602 (in other embodiments, the first gaming session 604A may have been recorded by another player or by an automated process). In response, the author may be presented with an interface 612 on the display device 614, which may be a television, tablet device, smartphone, VR headset, or the like. In some cases, the annotation 602 is created by the game system as the author is playing, which may be done in response to setting particular settings before the game play session. In some cases, the annotation 602 may be based on game play by the author and augmented by the author after the game play, such as to add commentary to the game play or edit the game play to exclude less interesting parts and/or highlight more interesting parts.

The interface 612 may include a selectable gameplay timeline 616, which represents recorded gameplay, as discussed in connection with FIG. 5, and may be graphically represented in the interface 612 as a filmstrip. The gameplay timeline 616 may be associated with at least one adjustable marker 618. The adjustable marker 618 may be initially displayed at the end of the gameplay timeline 616 by default representing the last frame of screen output 504 recorded in the recorded gameplay. The frame at the point represented by the adjustable marker 618 may be displayed in another location of the interface 612 as a representative frame 620 to aid with navigating the gameplay timeline 616 and selecting the point for insertion of the annotation 602. The author may move the adjustable marker 618 along the gameplay timeline 616 to mark a specific location within the recorded gameplay, which has the effect of displaying the corresponding representative frame 620.

Either before or after the author has selected the point within the game for the annotation 602, the author may select and/or provide the audio, video, text, graphics, highlighting and/or metadata for the annotation 602. In a simple case, the author provides text for the annotation 602 via the game controller 610 using a displayed virtual keyboard (not shown). For example, the author may type, "look here for treasure." In some cases, the audio, video, text, graphics, highlighting and/or metadata may be taken from the recorded gameplay.

After the content and location for the annotation 602 is provided or selected, the author may create the annotation 602 by pressing the share button 608 again or by making a selection from an on-screen menu (not shown). Thereafter, the created annotation 602 becomes linked to or associated with the point in the video game (and the corresponding game state 606) represented by the adjustable marker 618 in relation to the gameplay timeline 616.

As used herein, the term "linked" does not imply that any reference is inserted into the game code 603 (although this is possible in some embodiments). Rather, as described in greater detail below, an indication of a point within the game code 603 and/or at least some of the game state 606 at the insertion point of the annotation 602 may be stored in or associated with the annotation 602. In one embodiment, the created annotation 602 containing the reference or game state 606 is stored in connection with the game code 603 in the game library 312 shown in FIG. 3, such that it may be accessed by the overlay processor 517 during a subsequent gaming session 604B and presented as part of the screen output 504 in response to the triggering condition.

Figure 6C:
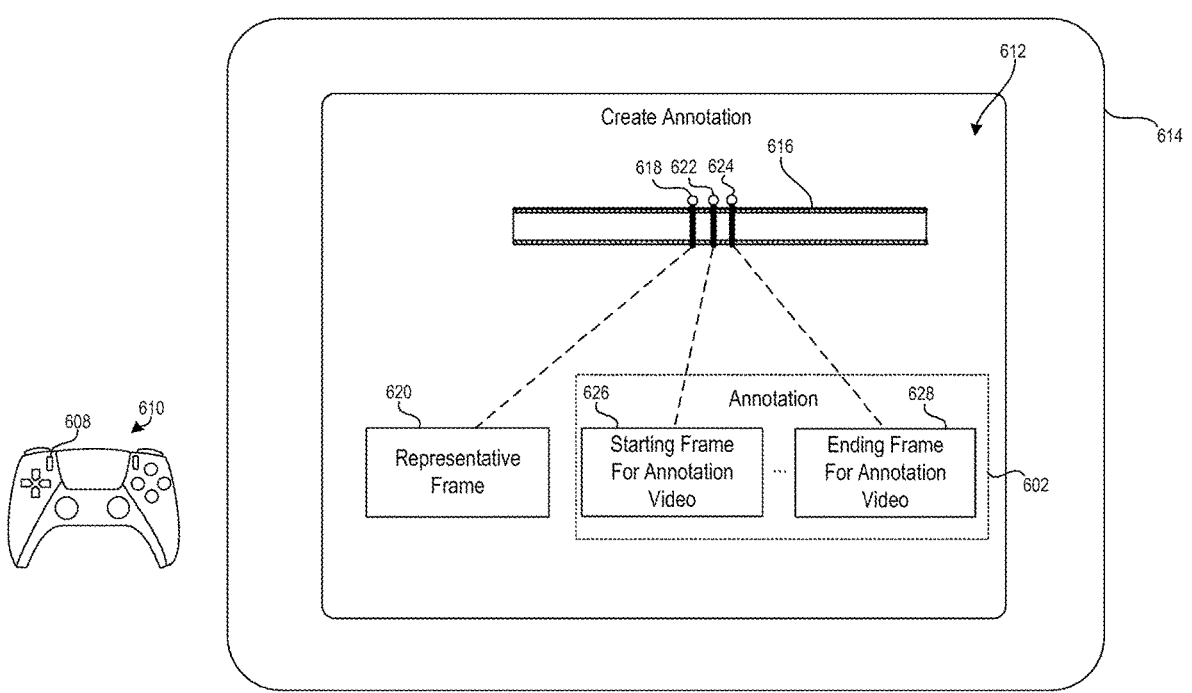
FIG. 6C illustrates a user interface for selecting video content for an annotation.

FIG. 6C illustrates the creation of an annotation 602 using video obtained from the recorded gameplay session, which may be a session played by the author, another user, or an automated process. Such an annotation 602 may be used, for example, in creating a walkthrough or strategy guide. As in FIG. 6B, the gameplay timeline 616 may be associated with the adjustable marker 618 for selecting the point in the gameplay for the annotation 602 to be inserted. Moving the adjustable marker 618 may change the displayed representative frame 620 for the insertion point of the annotation 602, as previously discussed.

The gameplay timeline 616 may also be associated with a beginning frame marker 622 and an ending frame marker 624, each of which may be movable along the gameplay timeline 616 to select a starting frame 626 and an ending frame 626, respectively, of the screen output 504 to be included in the annotation 602. Once the starting frame 626 and ending frame 628 are selected, the annotation 602 may be created as discussed in relation to FIG. 6B.

Figure 6D:
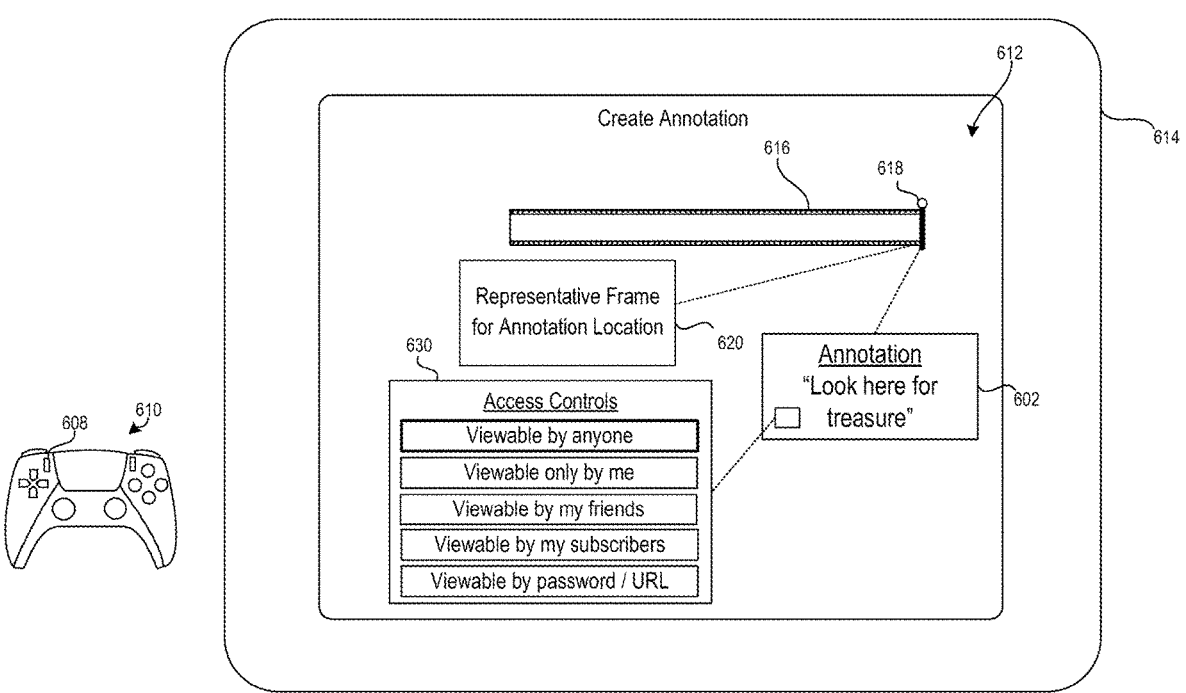
FIG. 6D illustrates a user interface for specifying access controls for an annotation.

In some embodiments, as shown in FIG. 6D, the author of the annotation 602 may apply access controls 630 that determine at least part of the triggering conditions for displaying the annotation 602 in the subsequent gaming session 604B. For example, one access control 630 may specify that the annotation 602 is viewable by anyone. Another access control 630 may limit viewing of the annotation 602 to only the author, which may be useful when the author is in the process of developing a walkthrough or strategy guide and does not wish for the annotation 602 to be currently viewed by others.

Yet another access control 630 may indicate that the annotation 602 can only be viewed by the author's friends. Many games have a social media component, and users may often communicate with and establish friendships within the game. For example, the author may designate various other players as friends. Alternatively, or in addition, the game my automatically identify players with whom the author regularly interacts as friends or potential friends. In some cases, other players may request that the author add them as friends.

Still another access control 630 may allow the author, such as an expert player, to monetize the annotation 602. For example, if the annotation 602 contains a tutorial, walkthrough, or strategy manual, the annotation may be valuable to other players of the game, who may be willing to give compensation to the author. In such a case, the game or the game operating system may allow an author to solicit and/or accept subscribers, who, for a one-time or recurring fee, may have access to the author's annotations 602 or a subset thereof.

In some embodiments, an annotation 602 may be locked to prevent unauthorized access. One or more access controls 630 may permit access to the annotation 602 via a key (password, token, URL, etc.). As an example, during gameplay, a player may be notified about the existence of an annotation 602 at a particular location in the game. However, if the annotation 602 is acknowledged or the player otherwise attempts to open the annotation, the player may be presented with a password screen for entering a password. Access will be blocked unless the player provides an appropriate password, which may be shared, for instance, by the author with the player or a group of players.

One method of accessing and/or unlocking an annotation 602 may be via a uniform resource locator (URL), which may be shared by the author with one or more other players. The URL may facilitate unlocking one or more annotations 602 and/or bring a second player to a particular location within the game defined within the annotation 602. In such a case, the annotation 602 may include game state data that allows the game code 603 to launch the subsequent gaming session 604B from the point defined within the annotation 602 in the manner of a saved game. The player may then continue from that point without having to play through the game from the beginning.

Figure 6E:
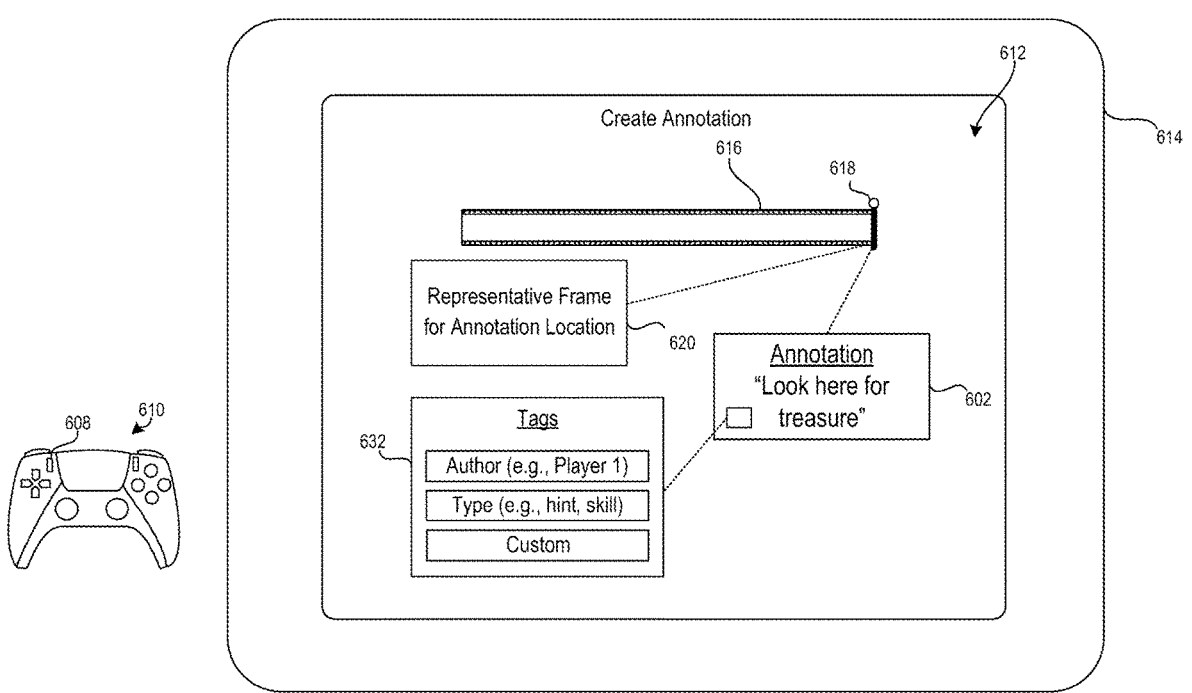
FIG. 6E illustrates a user interface for specifying tags for an annotation.

In some embodiments, as shown in FIG. 6E, the annotation 602 may be associated with one or more descriptive tags 632, which may include information about the author and/or the type or purpose of the tag 632. As described in greater detail below, the tag 632 may facilitate annotation filtering or blocking (i.e., a player may select which annotations 602 are displayed or not displayed), annotation "tracks" to which the player may subscribe, and/or the like.

For example, a tag 632 may indicate the author of the annotation 602, e.g., Player 1. Alternatively, or in addition, the tag 632 may specify a particular predefined type or category of the annotation 602, e.g., a hint, a skill, or a particular sub-category of skill. The tag 632 may also be a custom tag including one or more keywords that are specified by the author of the annotation 602.

Figure 6F:
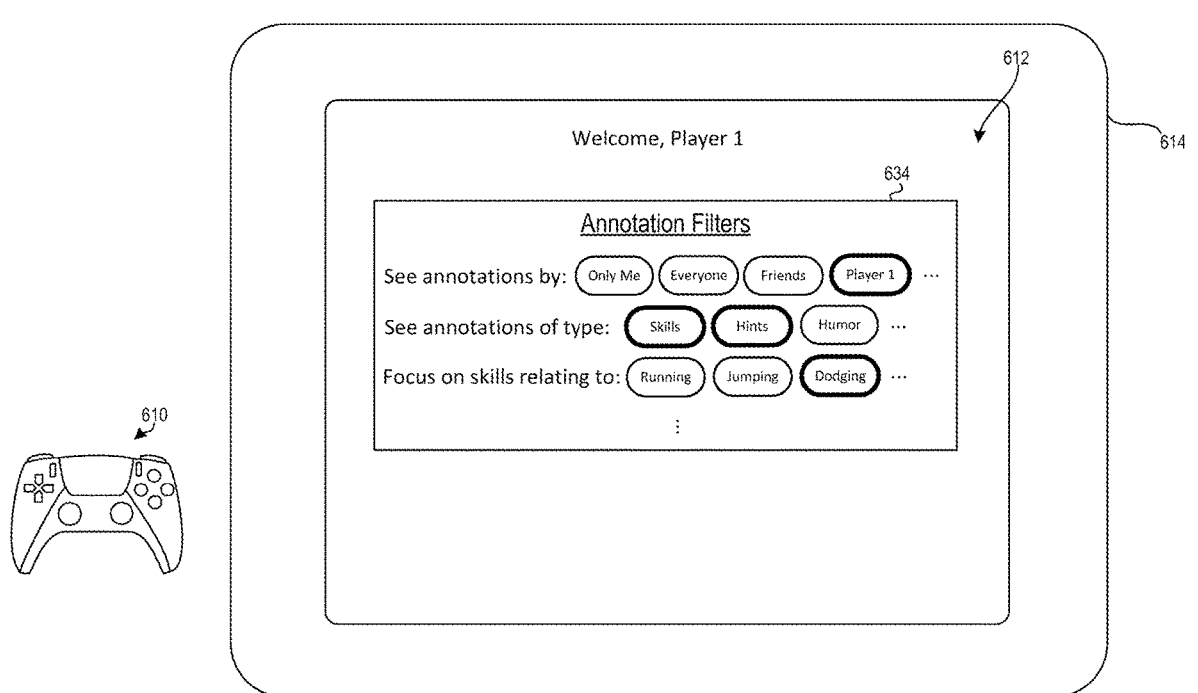
FIG. 6F illustrates a user interface for specifying annotation filters for a gameplay session.

The tags may enable a subsequent player, as shown in FIG. 6F, to establish various annotation filters 634 for what kinds of annotations 602 they wish to see or be notified regarding. Some annotation filters 634 may relate to the author of the annotation 602. For example, the player may specify that they only want to see annotations 602 in which they are the author, or that they are open to seeing all annotations 602 regardless of the author. Alternatively, the player may specify that they only want to see annotations 602 created by their friends or, in some cases, a particular author (e.g., Player 1).

Other filters may relate to the type or category of annotation 602, which may specified by a tag 632 associated with the annotation 602. For example, the player may specify a filter 634 indicating that they want to see annotations 602 related to improvement of skills, annotations 602 with game hints, and/or annotations 602 that highlight humor or make jokes in connection with the game. Where a selected filter 634 includes sub-categories, the player may be further enabled to refine their selection. For example, if the player wishes to see annotations 602 related to skills, they may be presented with a list of skills sub-categories corresponding to annotations 602 currently associated with the game from which the player may select, e.g., running, jumping, dodging, etc.

In some embodiments, a player may select multiple authors for and/or types of annotations 602 they would like to see or be informed about based on the tag 632. In other embodiments, the player may specify tags for annotations 602 they would like to exclude from display and/or notification.

The net effect of using tags 632 and annotation filters 634 is that annotations 602 on a game play session can be divided into multiple "tracks." For example, there can be separate tracks for different skills or different authors that a player can subscribe to via their annotation filters 634. There may be an annotation track showing jumping skills and a separate annotation track showing dodging skills. During the subsequent gameplay session 604B, zero or more tracks of annotations 602 can be selected to be shown based on customized selections by the player.

Figure 6G:
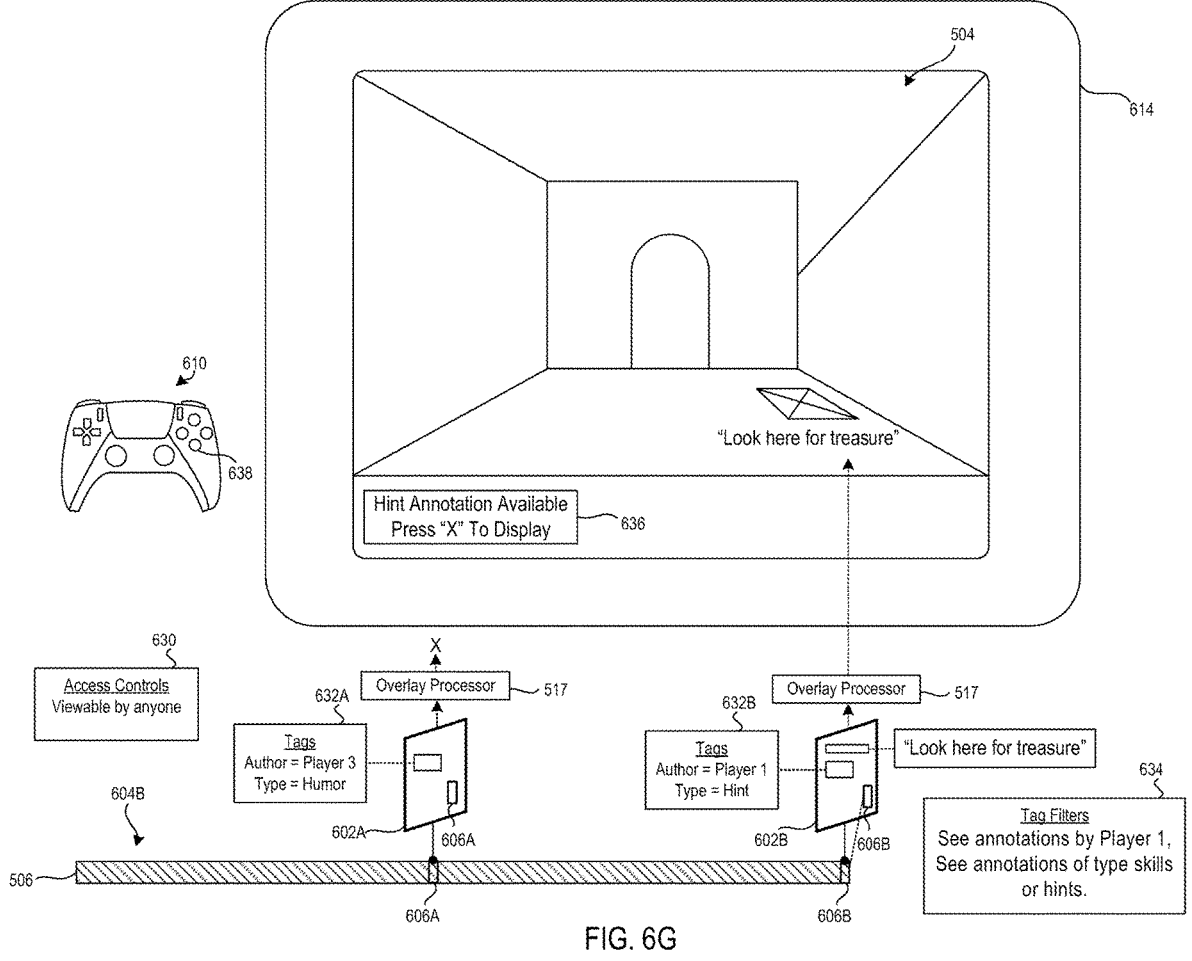
FIG. 6G illustrates a processing of two annotations in connection with a gameplay session.

FIG. 6G illustrates the processing of two example annotations 602A and 602B during a subsequent gaming session 604B played by a player, e.g., Player 2. Annotation 602A includes tags 632A, e.g., author=Player 3, and type=humor, while annotation 602B includes tags 632B, e.g., author=Player 1, and type=hint. The present example assumes the selections by Player 1 reflected in the access controls 630 shown in FIG. 6D and the selections by Player 2 reflected in the annotation filters 634 shown in FIG. 6F, e.g., see annotations by Player 1, see annotations of type skills or hints.

The player may play the game to the point in the gameplay associated with the annotation 602A. For example, in an RPG, the player may spatially navigate to a location in the game where at least some of the current game state 606A from the game state data 506 of the subsequent gameplay session 604B matches at least some of the game state 606A associated with the annotation 602A. In some embodiments, the overlay processor 517 will determine whether all triggering conditions are satisfied before presenting the annotation 602A, e.g., all access controls 630 and all annotation filters 634 are satisfied. In the case of annotation 602A, the access controls 630 (viewable by anyone) are satisfied. However, neither of the tags 632A satisfy the annotation filters 634 shown in FIG. 6F. Therefore, the annotation 602A will not be presented and the player will not be notified about the annotation 602A in this example.

Later in the gameplay, the player may play to the point associated with the annotation 602B, e.g., at least some of the current game state 606B from the game state data 506 matches at least some of the game state 606B associated with the annotation 602B In this case, the tags 632B do satisfy the annotation filters 634B, such that all triggering conditions are satisfied. Accordingly, the overlay processor 517 may proceed with overlaying the content of the annotation 602B (e.g., "look here for treasure") upon the screen output 504 of the subsequent gaming session 604B.

In some embodiments, a notification 636 may be initially displayed to alert the player to the availability of the annotation 602B. The notification 636 could be audible (e.g., a sound), visual (e.g., an displayed icon), haptic (e.g., a vibration in a game controller or VR headset), and/or the like, and may indicate some information about the type of the annotation, e.g., hint, humor, skills improvement, etc. The notification 636 may prompt the player to activate a designated control 638 on the game controller 610 (or make a selection from a menu) in order to present the annotation 602B; otherwise, the annotation 602B may not be presented. If the player activates the designated control 638, the overlay processor 517 may proceed to present (e.g., display, play, execute) the annotation 602B. In the illustrated example, the text annotation 602B, "look here for treasure," may be displayed on the display device 614 at a location determined, for example, by metadata associated with the annotation 602B or at some other location.

Figure 6H:
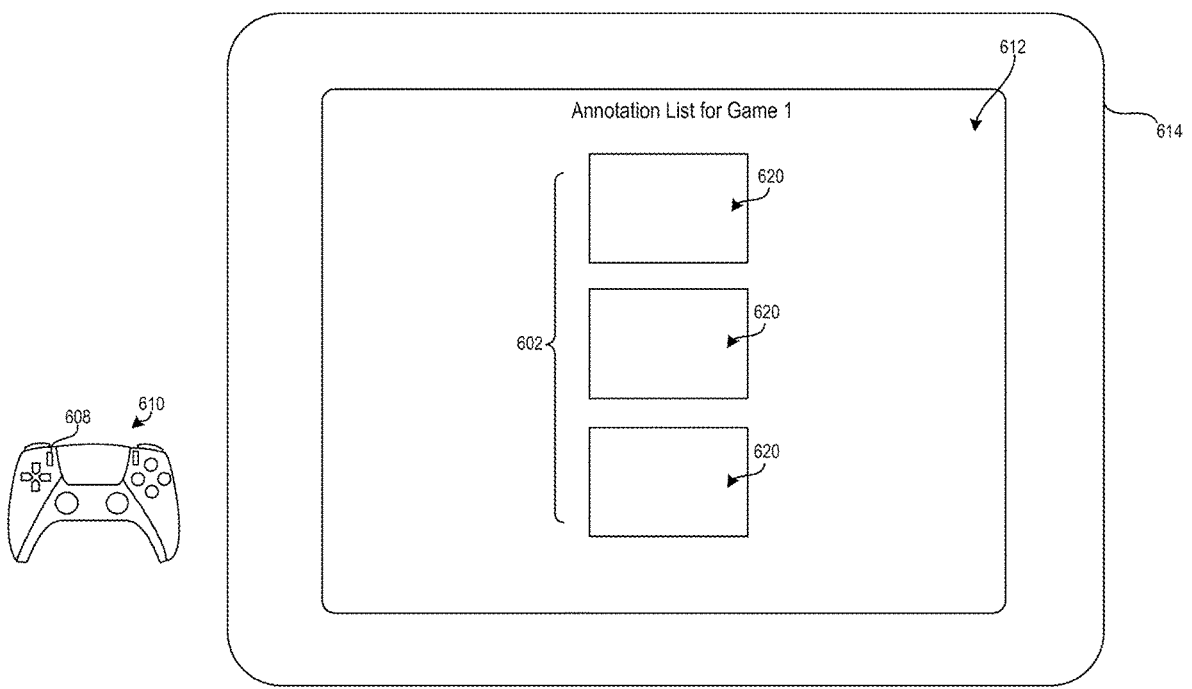
FIG. 6H illustrates an interface for displaying annotations associated with a video game.

In certain embodiments, a second player need not play until they encounter an annotation 602 in the gameplay. Since annotations 602 may be associated with the game code 603 of a particular game or game fragment, it is possible to display a list of the annotations 602 for a given game or game fragment. For example, a player may select a game from the library 312 as discussed in connection with FIG. 3. After selection, as shown in FIG. 6H, the player may be presented with a list of annotations 602 for the selected game, which may be ordered, in one embodiment, in terms of when along the gameplay timeline the annotation 602 appears in the game. Alternatively, or in addition, the annotations 602 may be ordered in other ways, such as by recency, popularity, rating level, number of comments, type, subject matter, or the like.

The listing of some annotations 602 may be restricted by any of the access controls 630 discussed with reference to FIG. 6D. In other words, the list may be filtered, such that the player only sees annotations 602 that are accessible to them. For example, the player may only see annotations 602 for which they are friends with the author, annotations 602 of other players to whom they are subscribed, and/or annotations 602 for which they have a key (e.g., password, URL, or token) for unlocking the annotation 602. If an annotation 602 does not satisfy one of the access controls 630, it may be hidden.

In some embodiments, the listed annotations 602 may be represented in the interface 612 by the representative frame 620 associated with the annotation 602. As noted above, the representative frame 620 may be a frame taken from the screen output 504 shown in FIG. 6A that corresponds to the point at which the annotation 602 has been inserted. Alternatively, the representative frame 620 may be supplied by the author or selected from any from the frames of screen output 504 from the recorded game. In some embodiments, the representative frame 620 may be replaced by representative frames 629 in the form of a video clip and/or include descriptive text, graphics, or the like.

When the player selects one of the listed annotations 602, the annotation 602 may be presented on the display device 614. In some embodiments, a listed annotation 602 may include game state data that allows the game code 603 to launch gameplay at the point in the game associated with the annotation 602, such that the second player may not only view the annotation but also see it in context. For example, as shown in FIG. 6G, the text annotation 602, "look here for treasure," only makes sense in the context of the video gaming session 604B, which identifies a particular place to look. Therefore, the game state data may be used to launch the game at the point associated with the annotation 602 in order to show the annotation 602 in its appropriate context.

Figures 6I, 6J, 6K, 6L, 6M:
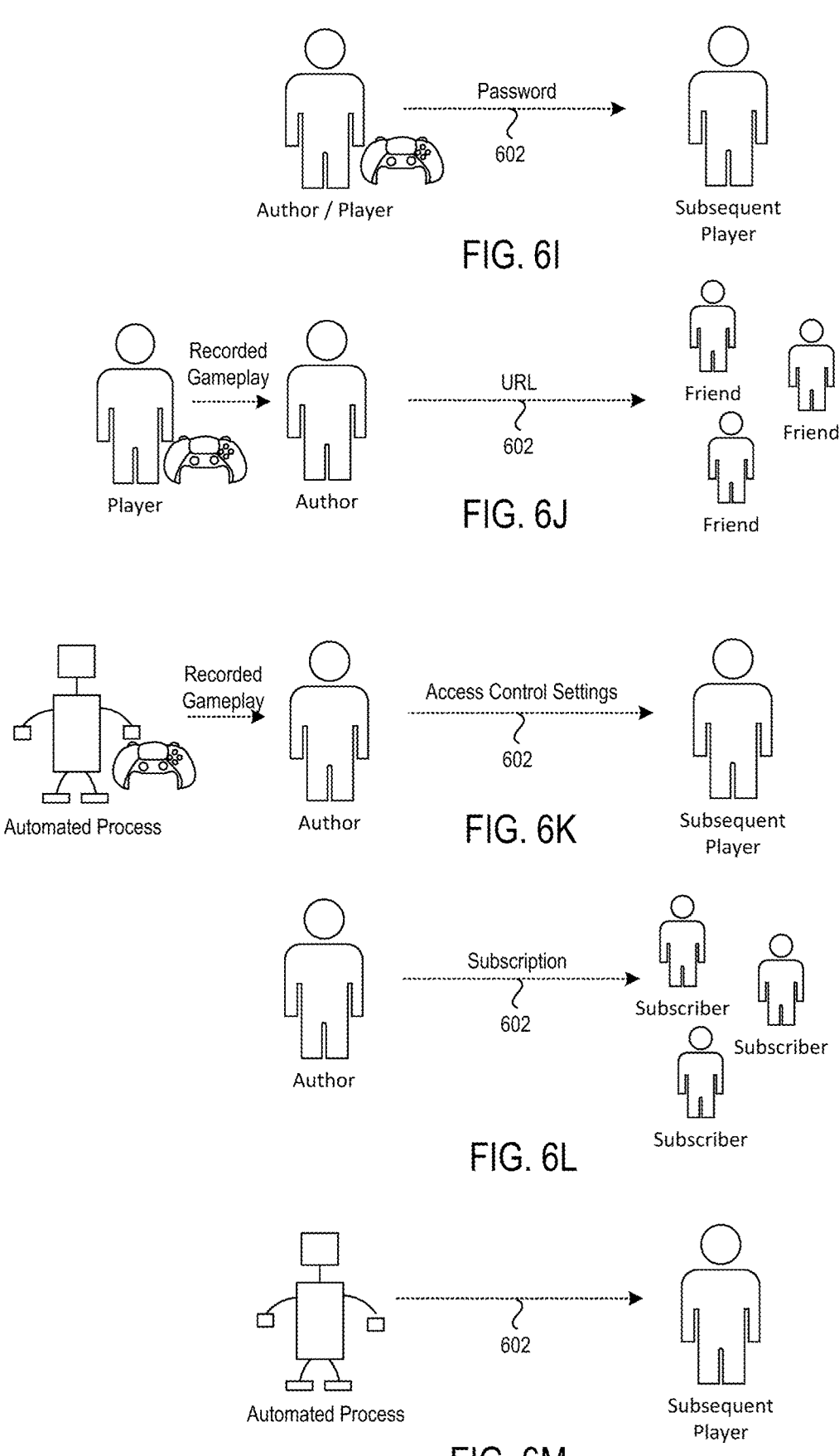
FIGS. 6I-6M illustrates several ways in which annotations are created and shared.

FIGS. 6I-6M illustrates several ways in which annotations 602 may be created and shared. These only represent some possible embodiments and are provided by way of example and not of limitation. In FIG. 6I, an author may play a video game to produce recorded gameplay. The author then annotates the recorded gameplay to produce an annotation 602, which is then shared with a subsequent player in the form of a password. The password allows the subsequent player to unlock the annotation 602 during a subsequent session of the video game.

In FIG. 6J, a player may play the video game to produce recorded gameplay. However, the recorded gameplay is annotated by a different person/author. The resulting annotation 602 may then be shared via a URL with a number of friends. The URL allows each of the friends to unlock the annotation 602 during a subsequent session of the video game.

In FIG. 6K, an automated process, e.g., an artificial intelligence (AI) player, may produce the recorded gameplay, which is then edited by a human author. The resulting annotation 602 may then be shared by specifying access control settings for the annotation 602, such that a subsequent player may be notified of and view the annotation 602 during a subsequent session of the video game.

In FIG. 6L, an author annotates the recorded gameplay, which may be produced by the author, another player, or an automated process. The resulting annotation 602 may then be shared with a number of subscribers via a subscription model. In such a case, each subscriber may have an indication in their respective gaming profiles of the subscription, which allows them to be notified of and view the annotation 602 during a subsequent session of the video game.

In FIG. 6M, an automated process annotates the recorded gameplay, which may be produced by either a human player or another automated process. The resulting annotation 602 may then be made available to one or more subsequent players using any of the aforementioned methodologies. A technique for automatically annotating recorded gameplay is discussed in greater detail in connection with FIG. 7.

In some embodiments, annotations 602, including the content (e.g., video, audio, text, graphics, highlighting, or metadata) and/or the location within the recorded game play at which the annotation 602 is to be inserted are automatically selected using machine learning (ML) rather than, or in addition to, being selected by human authors.

Figure 7:
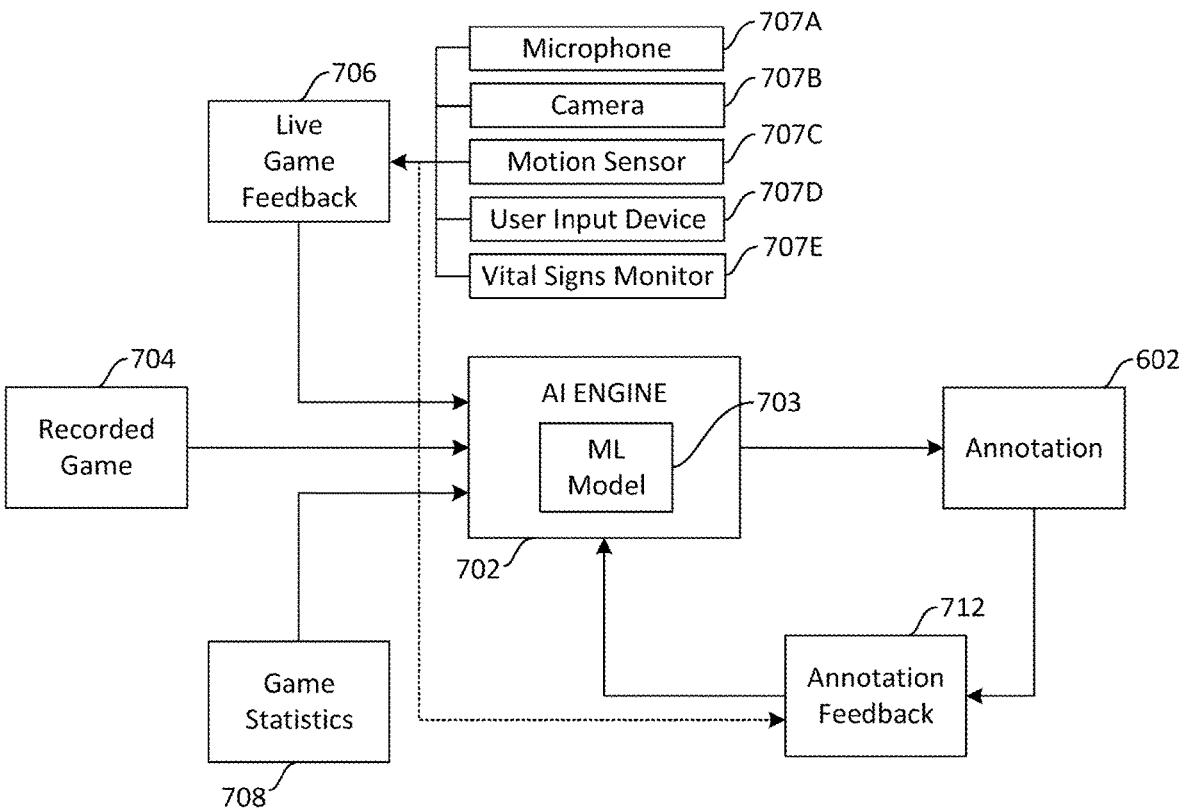
FIG. 7 is a system for selecting one or both of the content and location of an annotation using machine learning.

For example, as shown in FIG. 7, an artificial intelligence (AI) engine 702 may receive various input including, without limitation, a recorded game 704, live game feedback 706 from the recorded game 704, and game statistics 708. The AI engine 702 may include or have access to a trained ML model 703, such as a large language model, bi-directional transformer, zero/few shot learner, or deep neural network. The ML model 703 may be used by the AI engine 702 to predict an annotation 602 (including content and/or location) that will result in increased positive feedback, greater activity, and/or more positive ratings by users or a particular user.

The location at which the annotation 602 is to be inserted may be determined, for example, using techniques similar to those of determining the regions of interest in the recorded game play for game fragments, as discussed with reference to FIG. 5. In various embodiments, an insertion point for the annotation 602 may be automatically determined based on threshold detection of any one or more of the following: one or more user inputs, rate of user input, frequency of input, repeats of types of inputs, occurrences of input patterns, combination inputs (e.g., combo keys), motion vectors, pressure exerted on a controller, and/or implicit feedback, e.g., excitation of a user based on the live game feedback 706.

The live game feedback 706 may have been captured contemporaneously from one or more human users playing the recorded game 704. For example, the live game feedback 706 may include, without limitation, audible feedback, visual feedback, motion feedback, textual feedback, and/or vital signs feedback, all of which may indicate excitement, enjoyment, and/or engagement of the user with a particular point in the video game. Various levels of processing of the data from various input devices 707A-E may be done by a live game feedback processor before passing on data generated from the processing with all, none, or portions of the raw data from the input devices.

The audible feedback may be captured, for example, by a microphone 707A associated with a game console, game controller, or VR headset, and may include verbal expressions of excitement and/or various emotions experienced during gameplay, such as happiness, sadness, fear, disgust, and anger. Likewise, the visual feedback may include emotional expressions on the user's face (e.g., the user is smiling), eye tracking (as an indicator of attention or engagement), and the like, which may be captured by a camera 707B associated with the game console, game controller, or VR headset.

The motion feedback may be obtained from a motion sensor 707C, such as one or more accelerometers, magnetometers, cameras, and/or gyroscopes, associated with the game console, game controller, or VR headset. The textual feedback may be any form of user commentary including, without limitation, chats, emails, direct messages, ratings, and the like, which may be received via a user input device 707D, such as a game controller in conjunction with a displayed virtual keyboard, but may also include traditional user input devices, such as keyboards, mice, touch screens, or the like. The vital signs feedback may be any vital signs (e.g., heart rate or temperature) obtained via a vital signs monitor 707E (e.g., smart watch, smart ring, or suitably equipped game controller) monitoring the user during gameplay.

The game statistics 708 may include, without limitation, information about the structure of the recorded game 704 (as shown in FIG. 4A) including the level and/or scene structure, activity levels within various game sections (i.e., which sections of the video game are played the most or generate the most input data), points at which user(s) quit or became frustrated playing the recorded game 704, points at which user(s) completed a game section at a lower (or higher) than average time, user feedback or ratings for the recorded game 704 or sections thereof, and the like.

The content for the annotation 602 may be determined in various ways depending on the type of annotation 602. For example, for a hint-type annotation 602, video taken from the gameplay output showing an expert player completing a particular challenge in record time might be selected, as such may be predicted to produce high ratings and/or positive feedback from a viewer of the annotation 602.

The ML model 703 may have been previously trained using predetermined or automatically generated annotations, as well as indications of whether those annotations produced positive feedback, resulted in elevated levels of activity, and/or received high ratings by users.

The recorded game 704 may include recorded gameplay by one or more human players, as described in connection with FIG. 4A. In certain embodiments, the recorded game 704 may have been completed by an AI player, which evaluated gameplay output and produce user input in the same manner as a human player.

Based on the various inputs, the ML model 703 of the AI engine 702 may select content and/or a location of for an annotation 602 that is predicted to receive increased positive feedback, greater activity, and/or more positive ratings by users or a particular user.

The annotation 602 may then be presented (e.g., displayed, played, executed) such that may be viewed by a user in a gaming session. In some embodiments, the player may decide whether to view the annotation 602. A failure to view the annotation when presented may be considered negative feedback for the location and/or content/type of the annotation 602.

Once an annotation 602 is viewed by a user, the user may provide explicit and/or implicit annotation feedback 712 for the annotation 602. Explicit annotation feedback 712 may be in the form of a rating, such as a graphic rating, a numerical rating, a descriptive rating, and/or a comparative rating. Implicit annotation feedback 712 may include whether the user viewed the annotation 602 (failure to view the annotation 602 may be considered negative feedback in some embodiments) and/or the live game feedback 706, such as audible feedback, visual feedback, motion feedback, textual feedback, and/or vital signs feedback. Occasionally, some annotation feedback 712 may be positive (e.g., the user viewed the annotation 602), while other annotation feedback 712 suggests otherwise (e.g., the audible feedback has verbal cues indicating that the user did not enjoy the annotation 602). The negative implicit annotation feedback 712 may take precedence in some embodiments as being more accurate or relevant. Alternatively, various positive and negative feedback may be assigned different weights to determine an overall annotation feedback 712 for the user. In some cases, the user may rate different aspects of the same annotation, which may result in some aspects being rated positively and some aspects being rated negatively.

The annotation feedback 712 is then used to update the ML model 703 of the AI engine 702, such that the ML model 703 will generate annotations 602 in the future that have increased positive feedback, greater activity, and/or more positive ratings. For example, if the annotation feedback 712 was positive, the logic (e.g., neurons, nodes, weights) used by the ML model 703 to generate the annotation 602 will be strengthened, making it more likely that a similar annotation 602 will be generated in the future for similar input. Conversely, if the annotation feedback 712 was negative, the logic used by the ML model 703 to generate the annotation 602 will be weakened, making it less likely that the annotation 602 will be generated for similar input in the future.

Figure 8:
FIG. 8 illustrates a flowchart of a method for annotating a video game.
Figure 8:
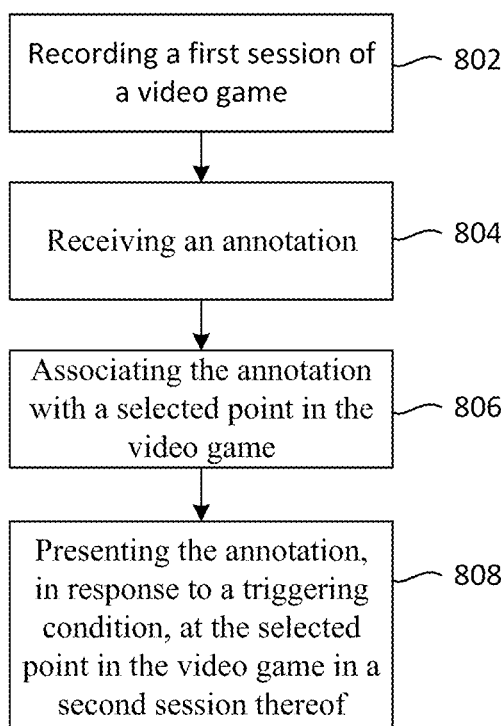

FIG. 8 is a flowchart of a method 800 for annotating a video game. According to some examples, the method 800 includes recording a first session of the video game including first gameplay output and first game state data. As previously described, the first session may be played and recorded by the author of the annotation, another user, or an automated process.

The method 800 continues by receiving 804 an annotation including one or more of video, audio, graphics, text, or highlighting. The annotation (including the content and/or location thereof) may be received from a human author (as described in relation to FIG. 6A-M) or an automated process (as described in relation to FIG. 7). The content (e.g., video, audio, graphics, text, or highlighting may be supplied by the author and/or taken from the gameplay output of the first recorded session of the video game.

In one embodiment, the method 800 continues by associating 806 annotation with a selected point in the video game, which may be defined by a selected portion of the first game state data. As previously noted, the selected portion, or game state, may be a subset or instance of the first game state data at a particular point in time.

The method 800 continues by presenting 808 the annotation, in response to a triggering condition, at the selected point in the video game in a second session thereof, the second session including second gameplay output and second game state data. The triggering condition may be that at least some of the second game state data matches at least some of the selected portion of the first game state data. The triggering condition may also include that the annotation includes a tag that satisfies an annotation filter specified by a player of the second session of the video game. The triggering condition may further include that a player of the second session unlocks the annotation using one or more of a password, token, or URL. In some cases, the second session is determined based on correlations to a first session, such as game location (which may include game level or geographical location), game state data, player reactions, and/or spectator reactions. When game play is identified as a second session that corresponds to a first session, the player can be presented with annotation from the first session, where the presentation may vary based on the game title and/or player preferences, such as to present a pop-up, show a picture-in-picture (PIP) display of the first session, or show an indication that can be clicked on to assess the first game play. In some cases, the set of first game play sessions that is examined to determine a correlation to a second game play session is limited by player preferences or player groupings, such as players associated with a particular game server or world. In some cases, the limitation may only look at first game sessions that have been shared publicly, annotated by the author, or are from players with a social connection to the game, like being in the same guild in a game title, being friends in a game system, or having played one or more game sessions together. In some cases, the second session may be by the same player as the first session. In some cases, the second session may be by a player different from the player that played the first session.

Figure 9:
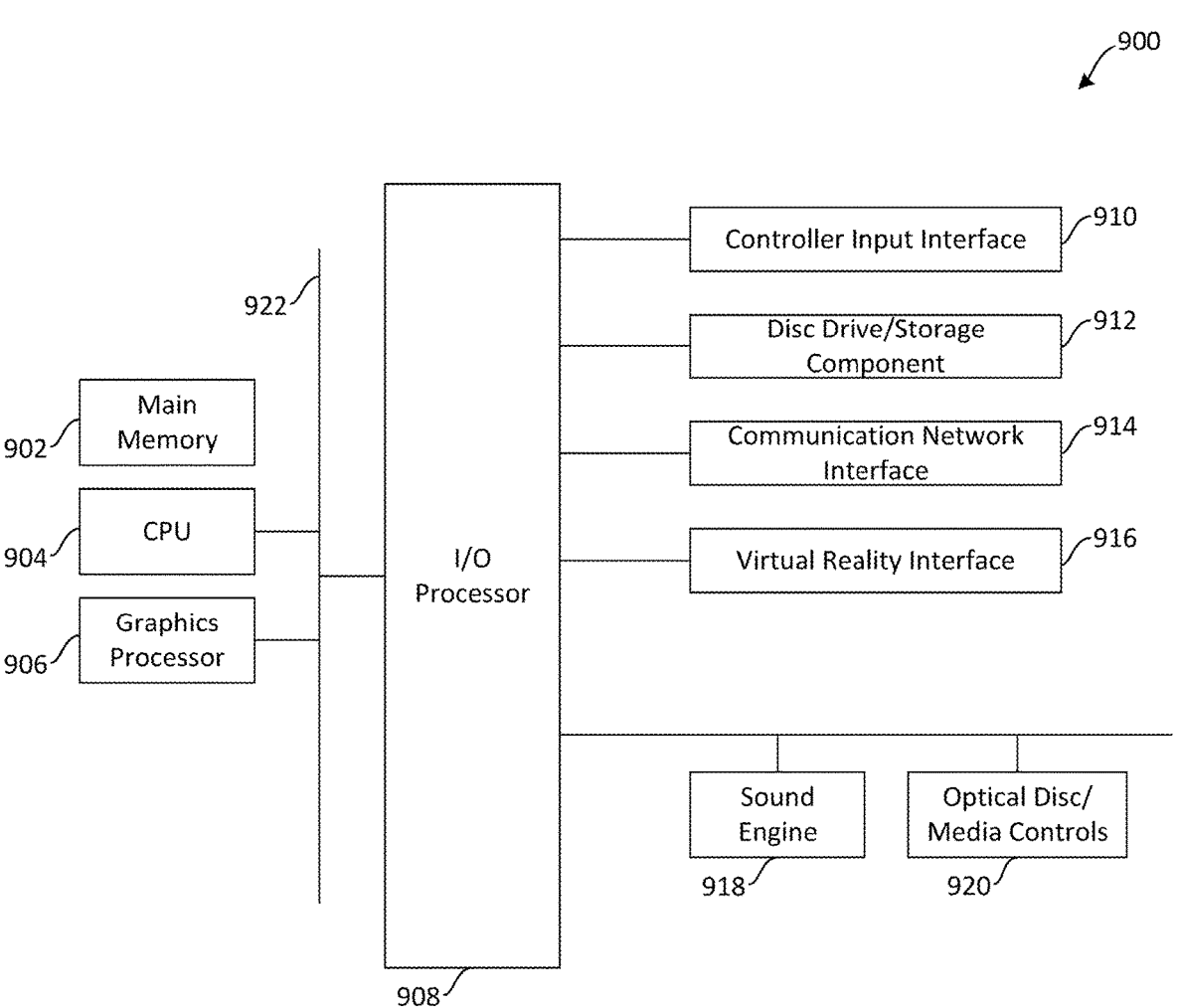
FIG. 9 illustrates a block diagram of an exemplary electronic entertainment system.

FIG. 9 illustrates a block diagram of an exemplary electronic entertainment system 900, which may be used in the context of the cloud gaming system shown in FIG. 2. The electronic entertainment system 900 as illustrated in FIG. 9 includes a main memory 902, a central processing unit (CPU) 904, graphic processor 906, an input/output (I/O) processor 908, a controller input interface 910, a hard disc drive or other storage component 912 (which may be removable), a communication network interface 914, a virtual reality interface 916, sound engine 918, and optical disc/media controls 920. Each of the foregoing are connected via one or more system buses 922.

Electronic entertainment system 900 as shown in FIG. 9 may be an electronic game console. The electronic entertainment system 900 may alternatively be implemented as a general-purpose computer, a set-top box, a hand-held game device, a tablet computing device, or a mobile computing device or phone. Electronic entertainment systems may contain some or all of the disclosed components depending on a particular form factor, purpose, or design.

Main memory 902 stores instructions and data for execution by CPU 904. Main memory 902 can store executable code when the electronic entertainment system 900 is in operation. Main memory 902 of FIG. 9 may communicate with CPU 904 via a dedicated bus. Main memory 902 may provide pre-stored programs in addition to programs transferred through the I/O processor 908 from hard disc drive/storage component 912, a DVD or other optical disc (not shown) using the optical disc/media controls 920, or as might be downloaded via communication network interface 914.

The graphics processor 906 of FIG. 9 (or graphics card) executes graphics instructions received from the CPU 904 to produce images for display on a display device (not shown). The graphics processor 906 of FIG. 9 may transform objects from three-dimensional coordinates to two-dimensional coordinates, and vice versa. Graphics processor 906 may use ray tracing to aid in the rendering of light and shadows in a game scene by simulating and tracking individual rays of light produced by a source. Graphics processor 906 may utilize fast boot and load times, 4K-8K resolution, and up to 120 FPS with 120 hz refresh rates. Graphics processor 906 may render or otherwise process images differently for a specific display device.

I/O processor 908 of FIG. 9 may also allow for the exchange of content over a wireless or other communications network (e.g., IEEE 802.x inclusive of Wi-Fi and Ethernet, 9G, 4G, LTE, and 3G mobile networks, and Bluetooth and short-range personal area networks). The I/O processor 908 of FIG. 9 primarily controls data exchanges between the various devices of the electronic entertainment system 900 including the CPU 904, the graphics processor 906, controller interface 910, hard disc drive/storage component 912, communication network interface 914, virtual reality interface 916, sound engine 918, and optical disc/media controls 920.

A user of the electronic entertainment system 900 of FIG. 9 provides instructions via a controller device communicatively coupled to the controller interface 910 to the CPU 904. A variety of different controllers may be used to receive the instructions, including handheld and sensor-based controllers (e.g., for capturing and interpreting eye-tracking-based, voice-based, and gestural commands). Controllers may receive instructions or input from the user, which may then be provided to controller interface 910 and then to CPU 904 for interpretation and execution. The instructions may further be used by the CPU 904 to control other components of electronic entertainment system 900. For example, the user may instruct the CPU 904 to store certain game information on the hard disc drive/storage component 912 or other non-transitory computer-readable storage media. A user may also instruct a character in a game to perform some specified action, which is rendered in conjunction with graphics processor 906, inclusive of audio interpreted by sound engine 918.

Hard disc drive/storage component 912 may include removable or non-removable non-volatile storage medium. Saud medium may be portable and inclusive of digital video disc, Blu-Ray, or USB coupled storage, to input and output data and code to and from the main memory 902. Software for implementing embodiments of the present invention may be stored on such a medium and input to the main memory via the hard disc drive/storage component 912. Software stored on a hard disc drive may also be managed by optical disk/media control 920 and/or communications network interface 914.

Communication network interface 914 may allow for communication via various communication networks, including local, proprietary networks and/or larger wide-area networks such as the Internet. The Internet is a broad network of interconnected computers and servers allowing for the transmission and exchange of Internet Protocol (IP)

data between users connected through a network service provider. Examples of network service providers include public switched telephone networks, cable or fiber services, digital subscriber lines (DSL) or broadband, and satellite services. Communications network interface allows for communications and content to be exchanged between the various remote devices, including other electronic entertainment systems associated with other users and cloud-based databases, services and servers, and content hosting systems that might provide or facilitate game play and related content.

Virtual reality interface 916 allows for processing and rendering of virtual reality, augmented reality, and mixed reality data. This includes display devices such that might be partial or entirely immersive virtual environments. Virtual reality interface 916 may allow for exchange and presentation of immersive fields of view and foveated rendering in coordination with sounds processed by sound engine 918 and haptic feedback.

Sound engine 918 executes instructions to produce sound signals that are outputted to an audio device such as television speakers, controller speakers, stand-alone speakers, headphones, or other head-mounted speakers. Different sets of sounds may be produced for each of the different sound output devices. This may include spatial or three-dimensional audio effects.

Optical disc/media controls 920 may be implemented with a magnetic disk drive or an optical disk drive for storing, managing, and controlling data and instructions for use by CPU 904. Optical disc/media controls 920 may be inclusive of system software (an operating system) for implementing embodiments of the present invention. That system may facilitate loading software into main memory 902.

The systems and methods described herein can be implemented in hardware, software, firmware, or combinations of hardware, software and/or firmware. In some examples, systems described in this specification may be implemented using a non-transitory computer readable medium storing computer executable instructions that when executed by one or more processors of a computer cause the computer to perform operations. Computer readable media suitable for implementing the control systems described in this specification include non-transitory computer-readable media, such as disk memory devices, chip memory devices, programmable logic devices, random access memory (RAM), read only memory (ROM), optical read/write memory, cache memory, magnetic read/write memory, flash memory, and application-specific integrated circuits. In addition, a computer readable medium that implements a control system described in this specification may be located on a single device or computing platform or may be distributed across multiple devices or computing platforms.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

30

What is claimed is:

1. A computer-implemented method comprising:
    recording a first session of a video game including first gameplay output and first game state data;
    associating an annotation with a first point in the video game that corresponds to a first portion of the first game state data, wherein the annotation includes one or more of video, audio, graphics, text, or highlighting;
    causing execution of a second session of the video game with a second gameplay output and second game state data different than the first portion of the first game state data; and
    presenting the annotation, in response to a triggering condition, at the first point in the video game in the second session.

2. The computer-implemented method of claim 1, wherein presenting the annotation includes overlaying the annotation over the second gameplay output at the first point or replacing at least a portion of the second gameplay output at the first point with the annotation.

3. The computer-implemented method of claim 1, wherein causing execution of the second session includes causing execution of the second session at the first point.

4. The computer-implemented method of claim 1, wherein the annotation includes metadata for highlighting one or more portions of a display screen or positioning the video, graphics, text, or highlighting upon the display screen.

5. The computer-implemented method of claim 1, further comprising receiving the annotation.

6. The computer-implemented method of claim 1, wherein the triggering condition includes at least some of the second game state data matching at least some of the first portion of the first game state data.

7. The computer-implemented method of claim 1, wherein:
    the annotation includes a tag; and
    the triggering condition includes the tag satisfying an annotation filter associated with execution of the second session of the video game.

8. The computer-implemented method of claim 7, wherein the tag specifies an author for the annotation the annotation filter specifies a particular author in order to satisfy the triggering condition.

9. The computer-implemented method of claim 7, wherein the tag specifies a type for the annotation the annotation filter specifies a particular type in order to satisfy the triggering condition.

10. The computer-implemented method of claim 1, further comprising locking the annotation to prevent unauthorized access, wherein the triggering condition includes unlocking the annotation based at least in part on user input.

11. The computer-implemented method of claim 10, further comprising sending a key for unlocking the annotation to an electronic device executing the second session.

12. The computer-implemented method of claim 11, wherein the key includes at one of a password, a token, or a uniform resource locator (URL).

13. The computer-implemented method of claim 10, wherein the triggering condition includes unlocking the annotation based at least in part
    in a profile of a player of the second session.

14. The computer-implemented method of claim 1, wherein:
    associating the annotation includes receiving at least one access control for limiting access to certain players; and
    the triggering condition includes a player of the second session satisfying the at least one access control.

15. The computer-implemented method of claim 14, wherein the at least one access control requires that the player of the second session be:
an author of the annotation;
a friend of the author; or
a subscriber of the author.

16. The computer-implemented method of claim 1, further comprising transmitting, at the first point in the video game, a notification to an electronic device executing the second session that the annotation is available to be displayed, wherein the triggering condition includes receiving consent to have the annotation presented.

17. The computer-implemented method of claim 1, wherein at least one of the annotation or the first point in the video game are provided by a trained machine learning model.

18. The computer-implemented of claim 1, wherein causing execution of the second session includes causing execution of the second session at a second point different than the first point.

19. The computer-implemented of claim 18, wherein the second point corresponds to a second portion of the second game state data that is different than the first portion.

20. The computer-implemented of claim 19, wherein the second point is prior to the first point.

21. A system comprising:
a memory comprising computer-executable instructions; and
a processor configured to access the memory and execute the computer-executable instructions to perform operations comprising:
recording a first session of a video game including first gameplay output and first game state data;
associating an annotation with a first point in the video game that corresponds to a first portion of the first game state data, wherein the annotation includes one or more of video, audio, graphics, text, or highlighting;
causing execution of a second session of the video game with a second gameplay output and second game state data different than the first portion of the first game state data; and
presents the annotation, in response to a triggering condition, at the first point in the video game in the second session.

22. The system of claim 21, wherein presenting the annotation includes overlaying the annotation over the second gameplay output at the first point or replacing at least a portion of the second gameplay output at the first point with the annotation.

23. The system of claim 21, wherein causing execution of the second session includes causing execution of the second session at the first point.

24. The system of claim 21, wherein the annotation includes metadata for highlighting one or more portions of a display screen or positioning the video, graphics, text, or highlighting upon the display screen.

25. The system of claim 21, wherein the memory comprises additional computer-executable instructions and the processor is further configured to access the memory and execute the additional computer-executable instructions to perform additional operations comprising receiving the annotation.

26. The system of claim 21, wherein the triggering condition includes at least some of the second game state data matching at least some of the first portion of the first game state data.

27. The system of claim 21, wherein:
the annotation includes a tag; and
the triggering condition includes the tag satisfying an annotation filter associated with execution of the second session of the video game.

28. The system of claim 27, wherein the tag specifies an author for the annotation the annotation filter specifies a particular author in order to satisfy the triggering condition.

29. The system of claim 27, wherein the tag specifies a type for the annotation the annotation filter specifies a particular type in order to satisfy the triggering condition.

30. The system of claim 21, wherein the memory comprises additional computer-executable instructions and the processor is further configured to access the memory and execute the additional computer-executable instructions to perform additional operations comprising locking the annotation to prevent unauthorized access, wherein the triggering condition includes unlocking the annotation based at least in part on user input.

31. The system of claim 30, wherein the memory comprises additional computer-executable instructions and the processor is further configured to access the memory and execute the additional computer-executable instructions to perform additional operations comprising sending a key for unlocking the annotation to an electronic device executing the second session.

32. The system of claim 31, wherein the key includes at one of a password, a token, or a uniform resource locator (URL).

33. The system of claim 30, wherein the triggering condition includes unlocking the annotation based at least in part data in a profile of a player of the second session.

34. The system of claim 21, wherein:
associating the annotation is associated with at least one access control for limiting access to certain players; and
the triggering condition includes a player of the second session satisfying the at least one access control.

35. The system of claim 34, wherein the at least one access control requires that the player of the second session be:
an author of the annotation;
a friend of the author; or
a subscriber of the author.

36. The system of claim 21, wherein the memory comprises additional computer-executable instructions and the processor is further configured to access the memory and execute the additional computer-executable instructions to perform additional operations comprising transmitting, at the first point in the video game, a notification to an electronic device executing the second session that the annotation is available to be displayed, wherein the triggering condition includes receiving consent to have the annotation presented.

37. The system of claim 21, wherein at least one of the annotation or the first point in the video game are provided by a trained machine learning model.

38. One or more non-transitory computer-readable media comprising computer-executable instructions that, when executed by one or more processors of an electronic device, cause the electronic device to perform operations comprising:
recording a first session of a video game including first gameplay output and first game state data;
associating an annotation with a first point in the video game that corresponds to a first portion of the first game state data, wherein the annotation includes one or more of video, audio, graphics, text, or highlighting;

causing execution of a second session of the video game with a second gameplay output and second game state data different than the first portion of the first game state data; and presenting the annotation, in response to a triggering condition, at the first point in the video game in the second session.

39. The one or more non-transitory computer-readable media of claim 38, wherein causing execution of the second session includes causing execution of the second session at a second point different than the first point.

40. The one or more non-transitory computer-readable media of claim 39, wherein the second point corresponds to a second portion of the second game state data that is different than the first portion.

* * * * *